US012633145B2

(12) United States Patent
Brown et al.

(10) Patent No.: US 12,633,145 B2
(45) Date of Patent: May 19, 2026

(54) APPARATUS AND METHOD FOR PERFORMING IMAGE AUTHENTICATION

(71) Applicant: Samsung Electronics Co., Ltd., Suwon-si (KR)

(72) Inventors: Michael Scott Brown, Toronto (CA); Abhijith Punnappurath, North York (CA); Abdelrahman Abdelhamed, Scarborough (CA); Luxi Zhao, Toronto (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 457 days.

(21) Appl. No.: 18/143,306

(22) Filed: May 4, 2023

(65) Prior Publication Data

US 2024/0029460 A1    Jan. 25, 2024

Related U.S. Application Data

(60) Provisional application No. 63/390,874, filed on Jul. 20, 2022.

(51) Int. Cl.
G06V 20/00        (2022.01)
G06V 10/82        (2022.01)
(52) U.S. Cl.
CPC .............. G06V 20/95 (2022.01); G06V 10/82 (2022.01)
(58) Field of Classification Search
None
See application file for complete search history.

(56) References Cited

U.S. PATENT DOCUMENTS

| | | | |
|---|---|---|---|
| 7,995,239 B2 | 8/2011 | Yonaha | |
| 11,594,053 B2 * | 2/2023 | Choi ...................... | G06V 10/44 |
| 11,677,897 B2 | 6/2023 | Zhao et al. | |
| 2017/0124385 A1 * | 5/2017 | Ganong ................. | G06F 16/50 |
| 2018/0101751 A1 | 4/2018 | Ghosh et al. | |

(Continued)

FOREIGN PATENT DOCUMENTS

| | | |
|---|---|---|
| CN | 112465783 A | 3/2021 |
| CN | 112598643 A | 4/2021 |

(Continued)

OTHER PUBLICATIONS

Bi et al., "Reality Transform Adversarial Generators for Image Splicing Forgery Detection and Localization," Proceedings of the IEEE/CVF International Conference on Computer Vision (ICCV), 2021, pp. 14294-14303 (Year: 2021).*

(Continued)

*Primary Examiner* — Soo Shin
(74) *Attorney, Agent, or Firm* — Sughrue Mion, PLLC

(57)        ABSTRACT

An electronic device may be provided to identify fake pixels from an image that is processed via an image processor that uses artificial intelligence (AI) technology and/or an AI camera module to perform image authentication. The electronic device may be configured to: obtain an input image; obtain a processed image of the input image via AI-based model; generate authentication metadata that indicates fake pixels that have been generated by the AI-based model; store the authentication metadata in association with the processed image in the at least one memory; and output the processed image with an indication of the fake pixels.

19 Claims, 18 Drawing Sheets

Original image

Processed image

(56)  References Cited

U.S. PATENT DOCUMENTS

| | | | |
|---|---|---|---|
| 2020/0126209 A1 | 4/2020 | Kim et al. | |
| 2021/0248401 A1* | 8/2021 | Timoshenko | .......... G06V 40/40 |
| 2021/0350504 A1 | 11/2021 | Shen et al. | |
| 2022/0124257 A1* | 4/2022 | Zhao | ........................ G06N 3/08 |
| 2023/0005122 A1* | 1/2023 | Peng | ..................... G06N 3/045 |
| 2023/0013380 A1 | 1/2023 | Choi et al. | |
| 2023/0116801 A1* | 4/2023 | Yao | ........................ G06V 10/26 |
| | | | 382/157 |

FOREIGN PATENT DOCUMENTS

| | | | |
|---|---|---|---|
| CN | 113536990 | A | 10/2021 |
| JP | 2020-64637 | A | 4/2020 |
| KR | 10-2125379 | B1 | 6/2020 |
| KR | 10-2021-0038482 | A | 4/2021 |
| KR | 10-2021-0069388 | A | 6/2021 |
| KR | 10-2021-0098381 | A | 8/2021 |
| KR | 10-2288645 | B1 | 8/2021 |

OTHER PUBLICATIONS

International Search Report and Written Opinion (PCT/ISA/220, PCT/ISA/210, and PCT/ISA/237) dated Sep. 27, 2023, issued by International Searching Authority for International Application No. PCT/KR2023/008301.
Communication dated Jul. 10, 2025, issued by the European Patent Office in counterpart European Application No. 23843184.5.

\* cited by examiner

FIG. 1

Skip Connection 203c

Intermediate Representation

Skip Connection 203a

Skip Connection 203b

Encoder 201

206

205

204

206e 206b    206d 206a    206c

205b 205d    205f 205c    205e

205a 204b    204d 204a    204c

Input Image

FIG. 11

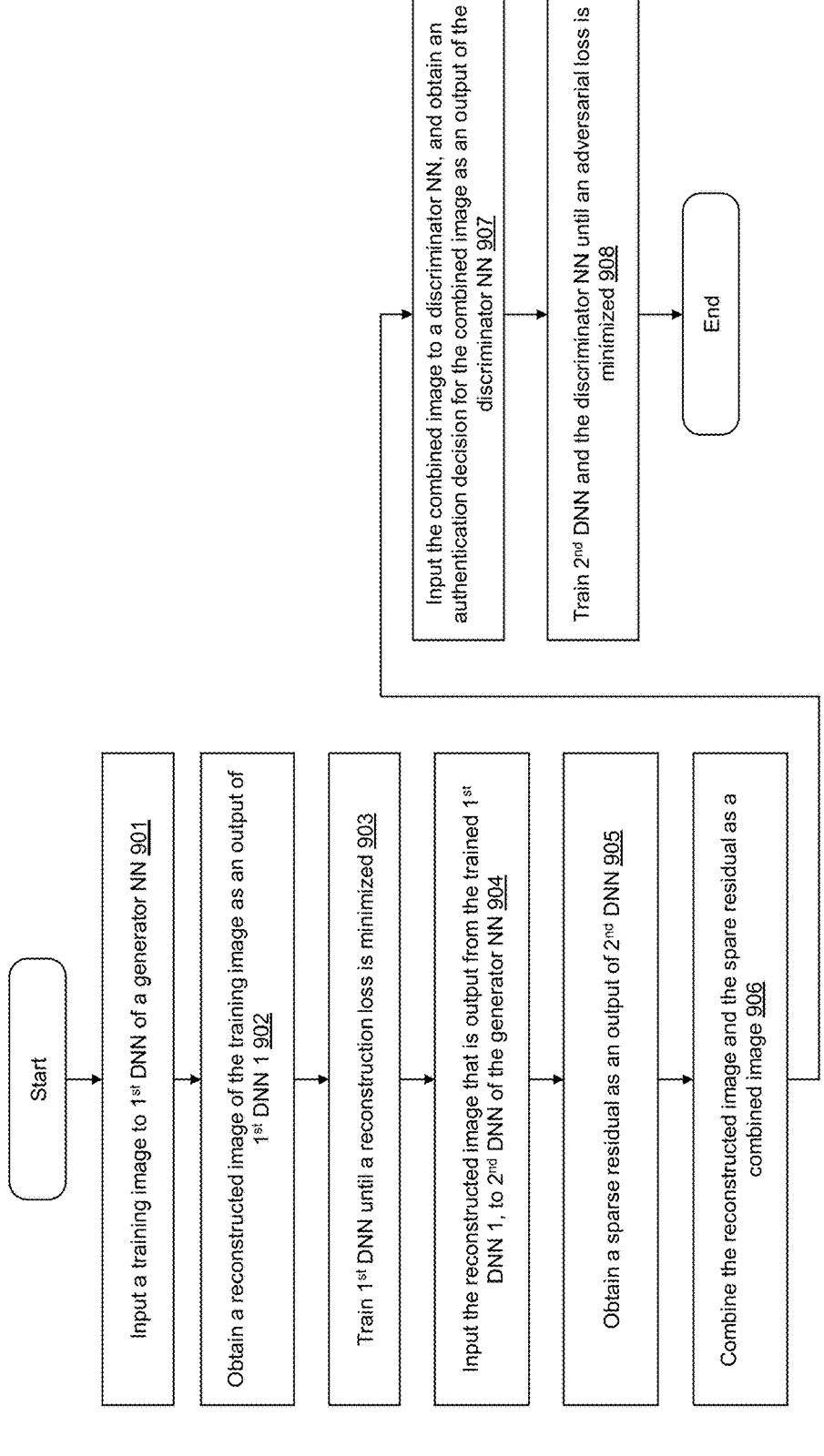

Start

Input a training image to 1st DNN of a generator NN 901

Obtain a reconstructed image of the training image as an output of 1st DNN 1 902

Train 1st DNN until a reconstruction loss is minimized 903

Input the reconstructed image that is output from the trained 1st DNN 1, to 2nd DNN of the generator NN 904

Obtain a sparse residual as an output of 2nd DNN 905

Combine the reconstructed image and the spare residual as a combined image 906

Input the combined image to a discriminator NN, and obtain an authentication decision for the combined image as an output of the discriminator NN 907

Train 2nd DNN and the discriminator NN until an adversarial loss is minimized 908

End

FIG. 13
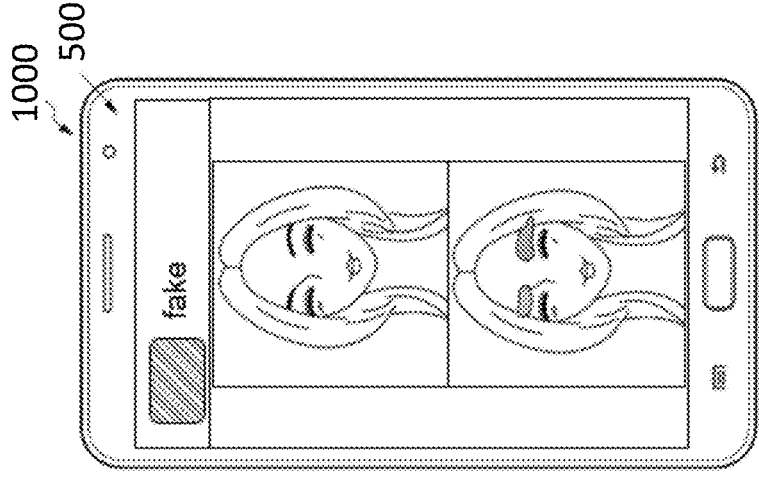
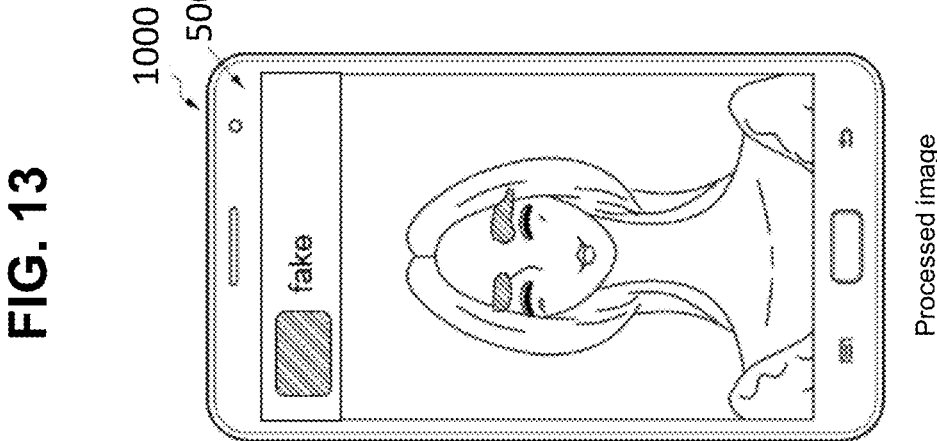
Processed image
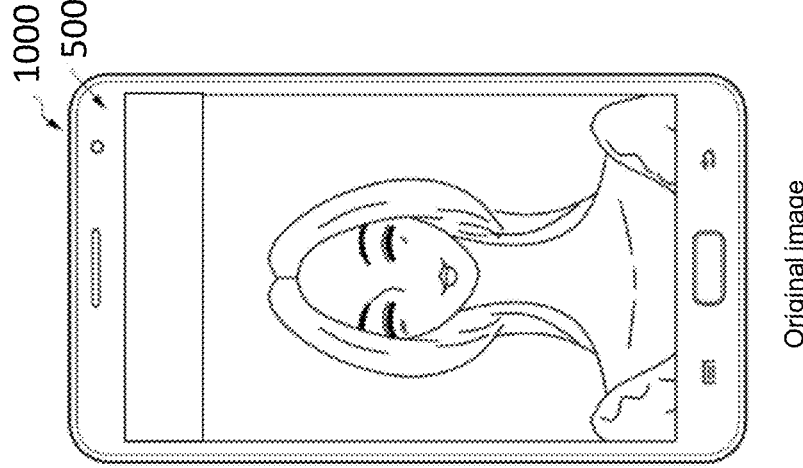
Original image

FIG. 15

APPARATUS AND METHOD FOR PERFORMING IMAGE AUTHENTICATION

CROSS-REFERENCE TO RELATED APPLICATION(S)

This application is based on and claims priority under 35 U.S.C. § 119 to U.S. Provisional Patent Application No. 63/390,874 filed on Jul. 20, 2022, in the U.S. Patent & Trademark Office, the disclosure of which is incorporated herein by reference in its entirety.

BACKGROUND

1. Field

The disclosure relates to an apparatus and method for identifying fake pixels from an image that is processed via an image processor that uses artificial intelligence (AI) technology and/or an AI camera module.

2. Description of Related Art

Digital visual media is one of the principal means of communication in today's world. However, the widespread availability and ease of use of photo editing software often casts a shadow over the authenticity of digital visual information. While images that are suspected to have been tampered with using external photo editing applications are the subject of careful investigation, images directly off a digital camera are considered pristine and beyond scrutiny. Cameras use dedicated onboard hardware to process and convert the light hitting the sensor to the final photograph that is displayed to the user. While this processing has traditionally been signal-processing based, in recent years, cameras have started to employ neural or artificial intelligence (AI) processing instead. These AI modules may "hallucinate" image content, that is, may generate a scene content as texture or imagery that was not present in the real scene. This implies that the authenticity of AI-camera-rendered images is not guaranteed, a crucial point that is largely overlooked in modern digital image forensics.

To address this issue, there has been a demand for a standard that camera manufacturers can adopt that allows the authenticity of camera-captured images to be verified.

SUMMARY

According to an aspect of the present disclosure, an electronic device is provided for performing image authentication on an image that is captured by an artificial intelligence (AI) camera module or processed by an AI-image signal processor (ISP). The electronic device may include: at least memory storing instructions; and at least one processor configured to execute the instructions to: obtain an input image; obtain a processed image of the input image via an AI-based model; generate authentication metadata that indicates fake pixels that have been generated by the AI-based model; store the authentication metadata in association with the processed image in the at least one memory; and output the processed image with an indication of the fake pixels.

The authentication metadata may be a binary authentication mask that indicates the fake pixels which are generated by adding, deleting, or modifying at least one scene content included in the input image.

The AI-based model may include a plurality of neural networks, and the at least one processor is further configured to: based on each of the plurality of neural networks generating the fake pixels, generate a plurality of authentication metadata for a plurality of processed images that are output from the plurality of neural networks, respectively.

The AI-based model may include a plurality of neural networks, and the at least one processor is further configured to: identify at least one neural network of the plurality of neural networks that generates the fake pixels, based on a loss type of each of the plurality of neural network; generate the authentication metadata for at least one processed image that is output from the at least one neural network; and skip generation of the authentication metadata for at least one remaining neural network that is identified as not generating the fake pixels, among the plurality of neural networks.

The at least one processor may be further configured to: identify the at least one neural network that is trained using a perceptual loss or an adversarial loss, as the at least one neural network that generates the fake pixels; and identify a neural network that is trained using a reconstruction loss, or is configured to change colors of the input images without altering scene content, as the at least one remaining neural network that does not generate the fake pixels.

The at least one processor may be further configured to: generate the authentication metadata by: applying to the input image a color transform that maps colors of the input image to an output image of at least one neural network of the AI-based model, to obtained a color transformed image; and computing a difference metric between the color transformed image and the output image for each pixel.

The at least one processor may be further configured to: generate the authentication metadata via the AI-based model that includes a generator neural network.

The generator neural network may include: a first neural network that is trained using a reconstruction loss at a first training step; and a second neural network that is jointly trained with a discriminator neural network using an adversarial loss, at a second training step at which network parameters of the first neural network are fixed, wherein the at least one processor may be further configured to generate the authentication metadata based on an output of the second neural network.

According to an aspect of the present disclosure, there is provided a method for performing image authentication on an image that is captured by an artificial intelligence (AI) camera module or processed by an AI-image signal processor (ISP). The method may include: obtaining an input image; obtaining a processed image of the raw image via an artificial intelligence (AI)-based model; generating authentication metadata that indicates fake pixels that have been generated by the AI-based model; storing the authentication metadata in association with the processed image in the at least one memory; and outputting the processed image with an indication of the fake pixels.

The authentication metadata may be a binary authentication mask that indicates the fake pixels which are generated by adding, deleting, or modifying at least one scene content included in the raw image.

The AI-based model may include a plurality of neural networks, and the method may include: based on each of the plurality of neural networks generating the fake pixels, generating a plurality of authentication metadata for a plurality of processed images that are output from the plurality of neural networks, respectively.

The AI-based model may include a plurality of neural networks, and the method may include: identifying at least one neural network of the plurality of neural networks that generates the fake pixels, based on a loss type of each of the plurality of neural network; generating the authentication metadata for at least one processed image that is output from the at least one neural network; and skipping generation of the authentication metadata for at least one remaining neural network that is identified as not generating the fake pixels, among the plurality of neural networks.

The method may further include: identifying the at least one neural network that is trained using a perceptual loss or an adversarial loss, as the at least one neural network that generates the fake pixels; and identifying a neural network that is trained using a reconstruction loss, or is configured to change colors of the input images without altering scene content, as the at least one remaining neural network that does not generate the fake pixels.

The generating of the authentication metadata may include: applying to the input image a color transform that maps colors of the input image to an output image of at least one neural network of the AI-based model, to obtained a color transformed image; computing a difference metric between the color transformed image and the output image for each pixel; and generating the authentication metadata based on the difference metric.

The generating of the authentication metadata may include: generating the authentication metadata via the AI-based model that includes a generator neural network.

The generator neural network may include: a first neural network that is trained using a reconstruction loss at a first training step; and a second neural network that is jointly trained with a discriminator neural network using an adversarial loss, at a second training step at which network parameters of the first neural network are fixed, wherein the generating the authentication metadata may include: generating the authentication metadata based on an output of the second neural network.

According to an aspect of the present disclosure, there is provided a non-transitory computer readable storage medium that stores instructions to be executed by at least one processor to perform a method for performing image authentication on an image that is captured by an artificial intelligence (AI) camera module or processed by an AI-image signal processor (ISP). The method may include: obtaining an input image; obtaining a processed image of the input image via an artificial intelligence (AI)-based model; generating authentication metadata that indicates fake pixels that have been generated by the AI-based model; storing the authentication metadata in association with the processed image in the at least one memory; and outputting the processed image with an indication of the fake pixels.

The authentication metadata may be a binary authentication mask that indicates the fake pixels which are generated by adding, deleting, or modifying at least one scene content included in the input image.

The outputting the processed image with the indication of the fake pixels, may include: displaying the binary authentication mask to be overlaid on the processed image.

The AI-based model may include a plurality of neural networks, and the method may include: based on each of the plurality of neural networks generating the fake pixels, generating a plurality of authentication metadata for a plurality of processed images that are output from the plurality of neural networks, respectively.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which:

FIG. 1 is a diagram of an electronic device for performing image authentication according to embodiments of the present disclosure;

FIG. 11 is a flowchart illustrating a method of generating authentication metadata using a neural network model according to embodiments of the present disclosure;

FIG. 13 illustrates a graphical user interface for identifying fake pixels according to embodiments of the present disclosure;

FIG. 15 is a diagram of components of one or more devices of FIG. 14 according to embodiments of the present disclosure.

DETAILED DESCRIPTION

Figure 2A:
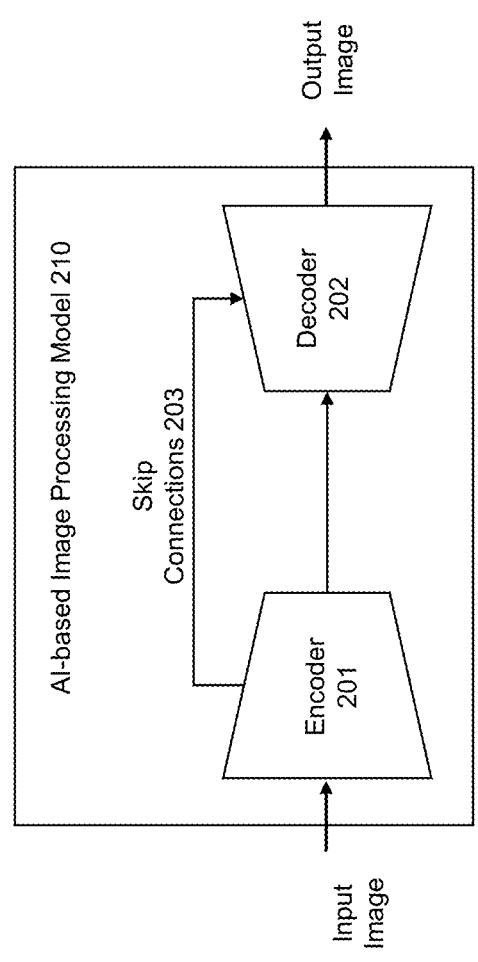
FIGS. 2A, 2B, and 2C are diagrams showing a structure of an AI-based image processing model according to embodiments of the present disclosure.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

The term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

One or more embodiments of the present disclosure provide a method and an apparatus for authenticating an image. An artificial intelligence (AI)-based image processing method may be performed on a raw image to obtain a processed image (e.g., a synthesized image), and authentication metadata may be generated to indicate whether each pixel of the processed image is authentic (real) or fake.

The term "raw image" may refer to an unprocessed digital output of an image sensor of a camera, or an image captured directly by a camera sensor, without any processing by an image signal processor (ISP) or with minimal processing of the ISP. The raw image may be also referred to as a "raw burst image" or "Bayer image." Light or photons incident from a scene are digitalized and recorded by a camera sensor, and the raw image is constituted with digital pixel intensity values recorded by the camera sensor before any processing is applied. For example, the raw image is an image that is not processed via an image signal processor (ISP) or an image processing unit (IPU), and may have a raw Bayer format. When the camera sensor includes sensor elements that are arranged in a pattern of red, green, and blue color channels, which is called a Bayer array, an image recorded by the Bayer array on the camera sensor is called the Bayer image. A raw burst image may refer to a series of images captured in rapid succession, at a high frame rate. The raw burst image may be captured in a continuous burst mode, where the camera captures images as quickly as possible until a memory buffer is full or the user stops the burst mode. The raw burst image (i.e., a set of images) is aligned and fused to produce a single raw image, at one of the image processing steps on the ISP. Depending on a loss function used by an AI-based image processing model that performs the alignment and fusion, even the fused single image raw may have fake pixel values, and there are cases where even the fused raw image is not guaranteed to be authentic.

Further, one or more embodiments of the present disclosure provide a method and an apparatus for storing the authentication metadata of the processed image, and displaying an indication of fake pixels in the processed image.

The authentication metadata may indicate fake pixels that are included in an image, and may be implemented in the form of a binary mask that indicates authentic pixels and fake pixels using binary values of "0" and "1." The binary mask may be an image that has either a value "0" or "1" at each pixel location. Pixels at all two-dimensional locations in the binary mask with a value of "1," is considered as fake (not authentic), and is considered as having been altered by image processing (e.g., AI-based image processing). The binary mask may be also referred to as an authentication map, an authentication mask, or an authentication binary mask.

Alternatively, the authentication metadata may be implemented in the form of a list of two-dimensional locations of fake pixels.

The term "fake pixel" may refer to a pixel that is modified via image processing (e.g., AI-based image processing) to change a scene object (e.g., a structure or texture) in an image.

From the perspective of a camera, the authentication metadata encodes which part of an image has been hallucinated via image processing (e.g., AI-based image processing). From the perspective of a camera user, the authentication metadata reveals which parts of an image are not authentic.

When a user queries whether an image is authentic, for example, via a photo gallery application installed in an electronic device, the electronic device may recover an authentication mask from the stored metadata, and may display the authentication mask to be overlaid on the image for easy visualization of the fake pixels.

Figure 1:
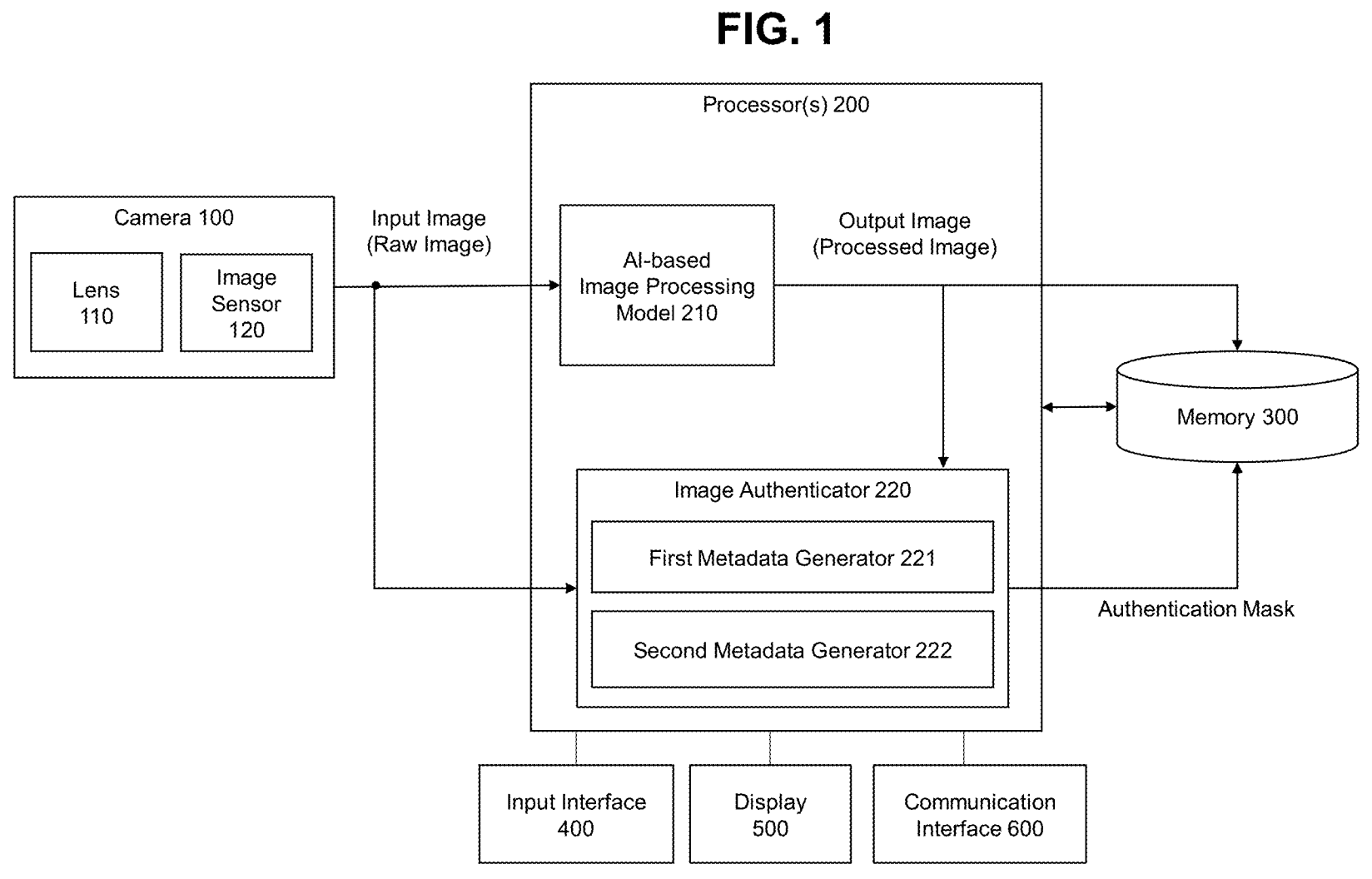

FIG. 1 is a diagram of an electronic device for performing image authentication according to embodiments of the present disclosure.

At an image capture time, the electronic device may generate authentication metadata to flag any scene content that was generated by an enhancement algorithm in an artificial intelligence (AI)-based image processing model. This authentication metadata may be embedded in a processed image that is output from the AI-based image processing model. For example, when a face-enhance neural network redrew eyebrows in an image, and authentication metadata may indicate fake pixels located at the regions of the eyebrows using binary values.

In detail, as shown in FIG. 1, the electronic device may include a camera 100, at least one processor 200, at least one memory 300, an input interface 400, a display 500, and a communication interface 600.

The camera 100 may include a lens 110, and an image sensor 120 that may include a charge-coupled device (CCD) sensor or complementary metal oxide semiconductor (CMOS) sensor, and a color filter array (CFA). The CFA may have red filters, green filters, blue filters which are arranged in the Bayer pattern. The camera 100 may capture an image based on a user input that is received via the input interface 400, and may output an unprocessed raw image to the at least one processor 200. For example, the output data of the CFA may be considered as raw image data. The input interface 400 may be implemented as at least one of a touch panel, a keyboard, a mouse, a button, a microphone, and the like.

The at least one processor 200 may include an artificial intelligence (AI)-based image processing model 210, and an image authenticator 220 that includes either one or both of a first metadata generator 221 and a second metadata generator 222. Authentication metadata may be obtained when a raw image is processed via an image signal processor (ISP) which includes both of a legacy signal-processing-based ISP and an AI-based ISP, and only the AI-based ISP. The first metadata generator 221 may generate authentication metadata based on a difference metric between an input image and a processed output image, and the second metadata generator 222 may generate authentication metadata using a thresholding operation.

The at least one processor 200 may receive an input image from the camera 100, or from an external device via the communication interface 600. The input image may be a raw image that is not processed by an image signal processor (ISP), and/or which has a Bayer format. The image signal processor (ISP) may be a specialized processor that is integrated into a camera module or interfaces with an image sensor, and may process a raw sensor image to a final display-referred output of the camera module.

Based on a user input of editing the input image or based on a default setting of the AI-based image processing model 210, the at least one processor 200 may operate the AI-based image processing model 210 to modify the input image, and output the modified input image as a processed image. The AI-based image processing model 210 may include one or more neural networks configured to perform demosaicing (for converting a Bayer pattern image captured by an image sensor into a full-color image), denoising (for removing random variations in the pixel values to improve image quality), super-resolution (for increasing the resolution of an image by combining multiple low-resolution images or using algorithms to generate new high-resolution pixels, filling in the missing details and improving the overall quality of the image), exposure correction (for adjusting the brightness of an image to produce a well-exposed result, and other image processing functions), cropping (for removing parts of an image to focus on a specific area or to change the aspect ratio of the image), color correction (for adjusting the colors in an image to produce a more natural-looking result), white balance (for adjusting the colors in an image to account for variations in lighting conditions), sharpening (for enhancing edges in an image to make them appear clearer and more detailed), unwanted object removal, new object addition, and the like.

In particular, the AI-based image processing model 210 may be implemented as a monolithic AI-based image processor where a single neural network block replaces the entire conventional image signal processor (FIG. 2A). Alternatively, the AI-based image processing model 210 may be implemented as two neural network blocks for front and back end processing (FIG. 3), more than two network blocks (FIG. 4A), or a hybrid model in which only some signal processing blocks of the conventional image single processor are replaced with neural network blocks.

The AI-based image processing model 210 may output the processed image via the display 500, and may store the processed image in the memory 300. Also, the AI-based image processing model 210 may provide the processed image to an image authenticator 220 so that the image authenticator 220 may generate authentication metadata that indicates authenticity of each pixel in the processed image. For example, the authentication metadata may be implemented as a binary authentication mask which assigns a value of 0 or 1 to each pixel to indicate authenticity. In an embodiment, the image authenticator 220 may assign a value "0" to a region of the binary authentication mask corresponding to a pixel which is determined as authentic, and may assign a value "1" to a region corresponding to a pixel which is determined as fake, in the binary authentication mask.

In embodiments of the disclosure, the AI-based image processing model 210 may provide any image that is processed via the AI-based image processing model 210 to the image authenticator 220, regardless of whether the image includes a fake pixel or not. The image authenticator 220 may determine whether there is any fake pixel, and if so, generate authentication metadata to indicate the fake pixel in the image. The image authenticator 220 may store the authentication metadata along with the image, in the memory 300.

In other embodiments of the disclosure, the AI-based image processing model 210 may send to the image authenticator 220, only the image that is processed through a neural network that changes a scene object and thereby creates fake or hallucinated pixels. The determination of whether a certain neural network changes a scene object in an input image, may be performed based on network type or configuration information (e.g., information in Table 1 below) stored in memory 300. For example, when the AI-based image processing model 210 includes a first neural network that is trained to minimize an adversarial loss and is configured to perform demosaicing to reconstruct pixels, and a second neural network that is trained to minimize a reconstruction loss and is configured to change the color or brightness of the input image, the AI-based image processing model 210 may determine that the first neural network performs a scene object changing algorithm that generate fake pixels, and the second neural network does not perform a scene object changing algorithm, based on information about the loss function types of the first neural network and the second neural network, respectively. In such a case, the AI-based image processing model 210 may send an output image of the first neural network to the image authenticator 220, so that the image authenticator 220 may generate authentication metadata indicating regions of fake pixel in the output image. The AI-based image processing model 210 may not send an output image of the second neural network to the image authenticator 220, so that the image authenticator 220 does not need to process the output image of the second neural network which does not include a fake pixel.

The image authenticator 220 may identify fake pixels via the first metadata generator 221 or the second metadata generator 222. The first metadata generator 221 may be used in situations where a camera manufacturer purchases 'black box' ISP modules from a third party without any information regarding the structure or configuration of the ISP modules, or is unable to retrain certain modules on the ISP due to other reasons. The first metadata generator 221 may operate with any AI-based image processing model 210 regardless of the neural network structure of the AI-based image processing model 210 by applying a difference metric to an output of the AI-based image processing model 210. On the other hand, the second metadata generator 222 may be utilized if the camera manufacturer has the flexibility to redesign the model architecture for a given module and retrain it accordingly. The second metadata generator 222 may operate with the AI-based image processing model 210 when the AI-based image processing model 210 has a particular network structure, for example, a structure having two separate neural networks that are trained using a reconstruction loss and an adversarial loss, respectively, to decouple fake pixels from authentic pixels.

The first metadata generator 221 may receive an input image and an output image (i.e., a processed image) of the AI-based image processing model 210 to obtain a color transform that converts the color of the input image to the color of the processed image. The first metadata generator 221 may apply the color transform to the input image, and compute a difference metric between the color-transformed input image and the processed image. The color transform may only modify colors, but not scene content so that a difference metric between the color transformed image and the output of the neural network reveals the fake pixels. The first metadata generator 221 may generate authentication metadata based on the difference metric between the color-transformed input image and the processed image. The authentication metadata may carry information indicating whether each pixel of the processed image is authentic or fake.

The second metadata generator 222 may interoperate with the AI-based image processing model 210 including a generator neural network that is trained using a discriminator neural network. The generator neural network may perform image processing on an input image in a manner in which the processed input image may or may not contain fake pixels. The discriminator neural network may determine whether the image it receives is a real image or an image generated by the generator. The generator neural network may include a first neural network and a second neural network that are connected in cascade. The first neural network and the second neural network may be trained via a two-step process. At a first training step, the first neural network may be trained using a reconstruction loss (e.g., L1 loss which is also known as Mean Absolute Error (MAE) loss, L2 loss which is also known as Mean Squared Error (MSE) loss, and the like). At a second training step, weights of the first neural network are fixed, and the second neural network is connected to the first neural network in cascade and trained with an adversarial loss using the discriminator neural network. The second neural network is trained to predict a sparse residual which when added to an output layer of the first neural network, is effective at fooling the discriminator neural network. The residual may represent a hallucinated content. Training the first neural network and the second neural network via the above-discussed two-step training process may offer the advantage of directly separating fake pixels from authentic pixels. The discriminator neural network may be used during a training process, and may be discarded during an inference process. According to an embodiment of the disclosure, only the first neural network may be trained at the first training step, and the second neural network may be connected in cascade with the first neural network only during the second training step.

The second metadata generator 222 may generate authentication metadata based on an output of the second neural network of the generator neural network. The second metadata generator 222 may apply a thresholding operation having a zero value or a non-zero value as a threshold, to the output of the second neural network. The second metadata generator 222 may identify pixel locations with values above the selected threshold in the output of the second neural network as fake, and may output authentication metadata (e.g., a binary authentication mask) including the fake pixel locations. In the meantime, the output of the first neural network and the output of the second neural network are combined, for example, by an adder, and the combination of the output of the first neural network and the output of the second neural network is provided to the display 500, or a subsequent image processing module for additional image processing.

The AI-based image processing model 210 may be incorporated into the camera hardware, and faking of pixel values may occur at image capture time as part of an image capture process on the camera hardware. However, the embodiments are not limited thereto as AI-based image processing model 210 may be provided outside of the camera hardware, and faking of pixel values may occur during post-capture process.

The display 500 may display the processed image and the authentication metadata individually, or together on the same display screen. For example, the authentication metadata may be provided in the form of a binary mask, and the binary mask may be overlaid on the processed image.

All the elements of the electronic device may be included in a single device, or may be included in more than one device. For example, the camera 100, the input interface 400, and the display 500 may be included in a client device (e.g., a smartphone), and at least one of the AI-based image processing model 210 and the image authenticator 220 may be included in a server. When the image authenticator 220 is included in the server, the client device may request the server to provide authentication metadata, and may receive the authentication metadata from the server.

Figure 2B:
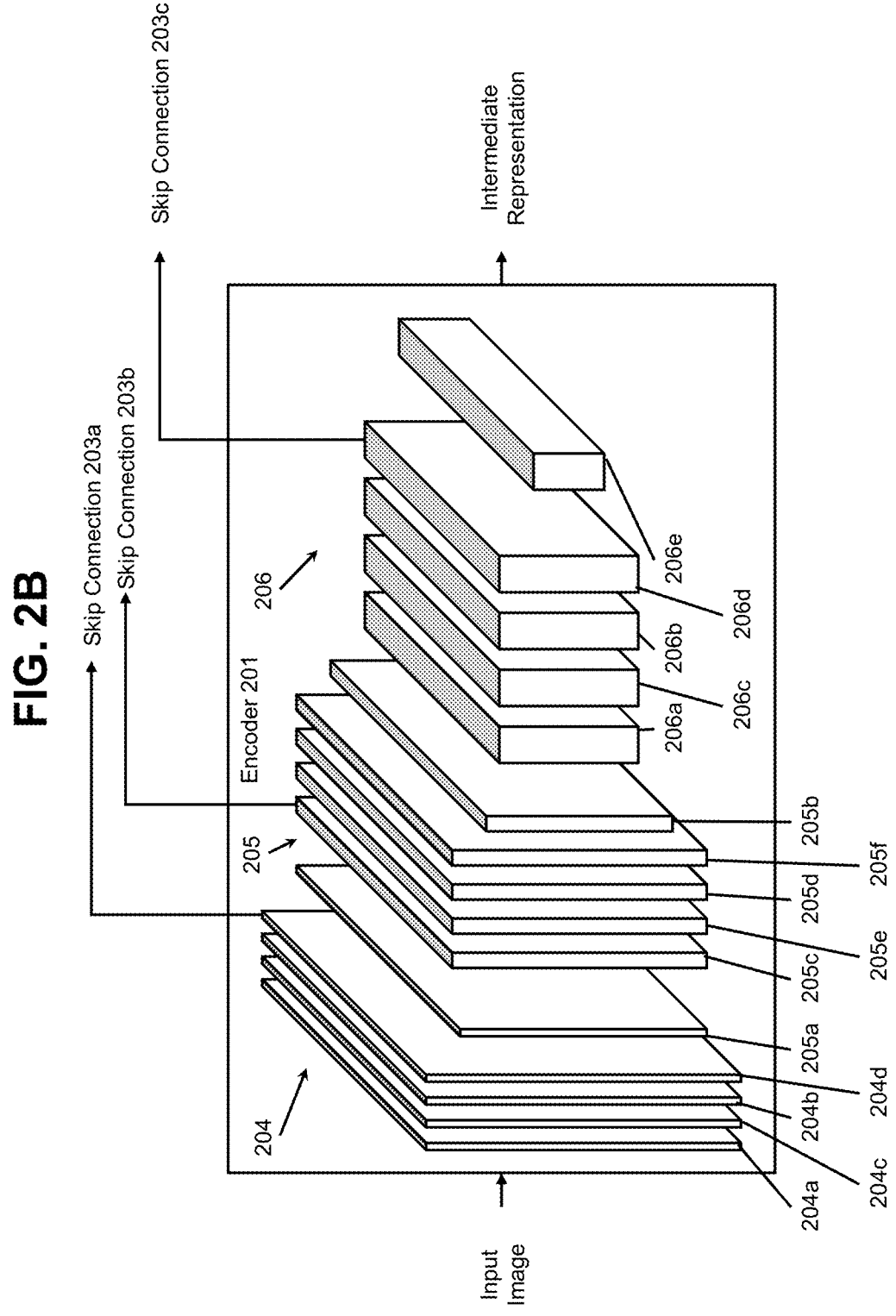
Figure 2C:
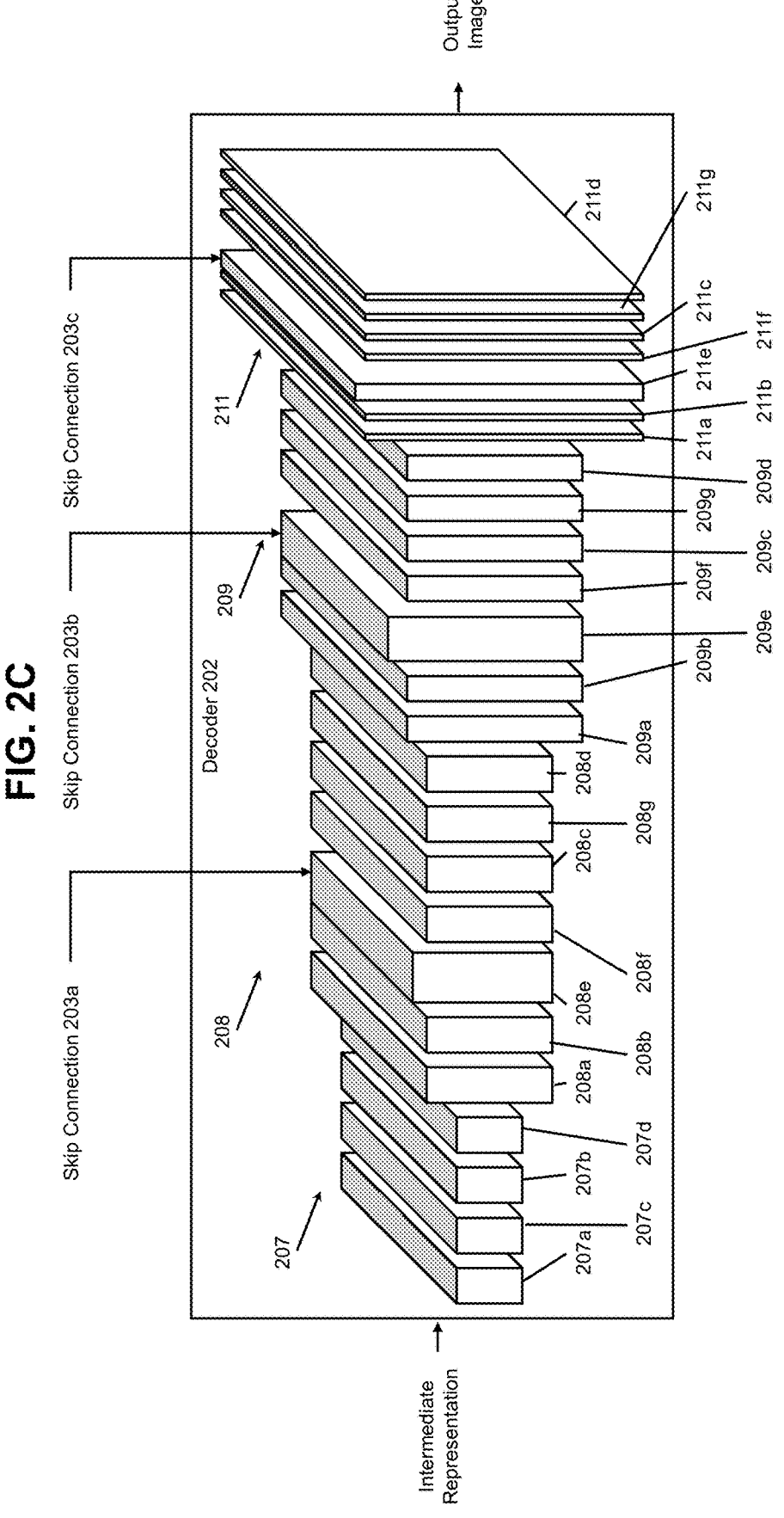

FIGS. 2A, 2B, and 2C are diagrams showing a structure of an AI-based image processing model 210 according to embodiments of the present disclosure.

Figure 3:
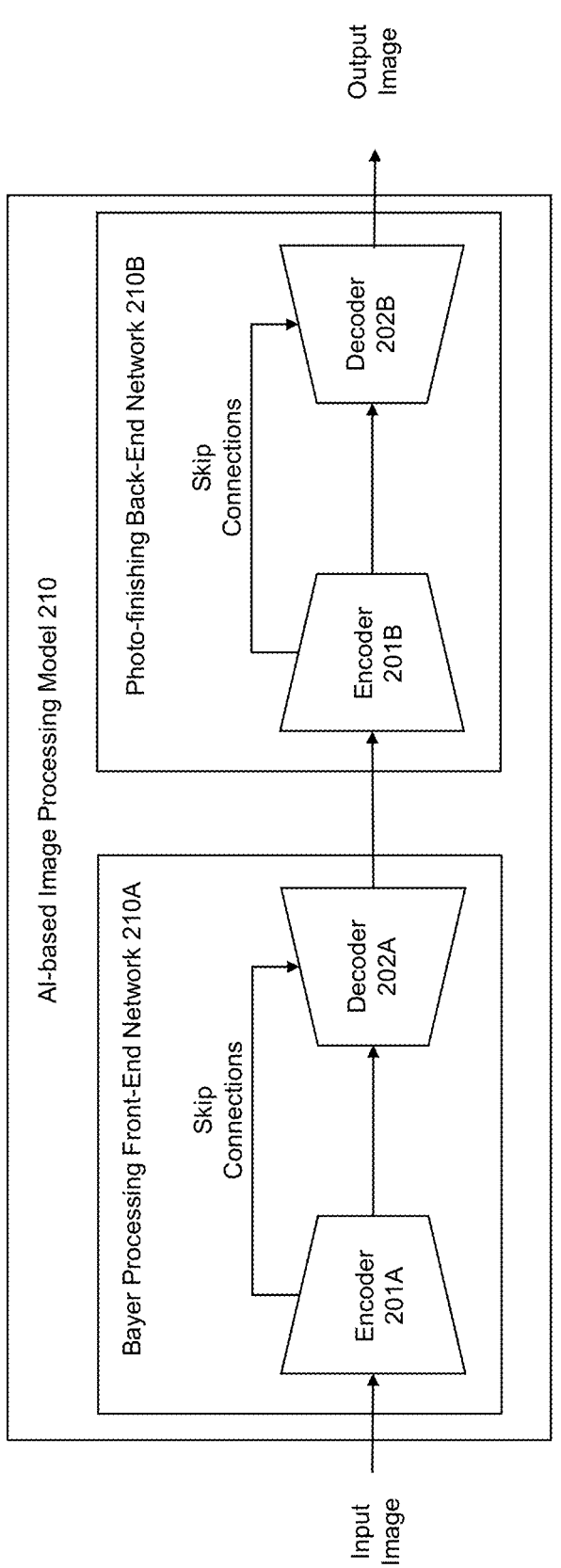
FIG. 3 is a diagram illustrating another structure of an AI-based image processing model according to embodiments of the present disclosure.

The AI-based image processing model 210 may be implemented as a monolithic network as shown in FIG. 2A, but may be implemented as multiple neural networks as shown in FIGS. 3 and 4. The AI-based image processing model 210 may replace all the elements or part of a conventional image signal processor (ISP).

Referring to FIG. 2A, the AI-based image processing model 210 may have a U-Net structure, and may include an encoder 201, a decoder 202, and skip connections 203. The AI-based image processing model 210 may be implemented in a client device (e.g., a mobile device) and/or a server.

The encoder 201 is configured to obtain (receive) an input image, obtain and transmit an intermediate representation of the input image. The encoder 201 includes a neural network, such as, for example, a convolutional neural network (CNN) or a deep neural network (DNN), which will be described in FIG. 2B below. The decoder 202 is configured to obtain and transmit an output image (e.g., a final image in a JPG format) based on the obtained intermediate representation. The decoder 202 includes a neural network, such as, for example, a CNN or DNN, which will be described in FIG. 2C below. Via the encoder 201 and the decoder 202, the AI-based image processing model 210 may perform at least one of active area cropping, linearization, black level subtraction, normalization, demosaicing, denoising, white balance, color space transform, digital exposure adjustment, local tone mapping, general color manipulation, selective color manipulation (e.g., skin tone manipulation), global tone mapping, YuV denosing, multi-frame fusion (e.g., multi-frame fusion in a YuV domain), a final color space conversion, gamma correction, grain adding process, resizing and resampling, and compression.

Referring to FIG. 2B, for example, the encoder 201 may have a U-Net structure including a first level 204, a second level 205 and a third level 206, although the structure of the encoder 201 is not limited thereto. The input image may be transferred through each of layers of the first level 204, the second level 205 and the third level 206 to obtain the intermediate representation that is output to the decoder 202.

The first level 204 may include 3×3 convolutional layers 204a and 204b with stride 1 and padding 1, and rectified linear unit (ReLU) layers 204c and 204d. The ReLU layer 204c may be interposed between the convolutional layers 204a and 204b, and the convolutional layer 204b may be interposed between the ReLU layers 204c and 204d. For example, each of the convolutional layers 204a and 204b and the ReLU layers 204c and 204d may have a size of 128×128×24.

The second level 205 may include 2×2 max-pooling layers 205a and 205b with stride 2, 3×3 convolutional layers 205c and 205d with stride 1 and padding 1, and ReLU layers 210e and 210f. The ReLU layer 210e may be interposed between the convolutional layers 205c and 205d, the convolutional layer 205d may be interposed between the ReLU layers 205e and 205f, and the convolutional layers 205c and 205d and the ReLU layers 205e and 205f may be interposed between the max-pooling layers 205a and 205b. For example, each of the convolutional layers 205c and 205d and the ReLU layers 205e and 205f may have a size of 64×64×48, the max-pooling layer 205a may have a size of 64×64×24, and the max-pooling layer 205b may have a size of 32×32×48.

The third level 206 may include 3×3 convolutional layers 206a and 206b with stride 1 and padding 1, ReLU layers 206c and 206d, and a 2×2 max-pooling layer 206e with stride 2. The ReLU layer 206c may be interposed between the convolutional layers 206a and 206b, the convolutional layer 206b may be interposed between the ReLU layers 206c and 206, and the max-pooling layer 206e may be disposed after the convolutional layers 206a and 206b and the ReLU layers 206c and 206d. For example, each of the convolutional layers 206a and 206b and the ReLU layers 206c and 206d may have a size of 16×16×192, and the max-pooling layer 206e may have a size of 8×8×192.

Referring to FIG. 2C, the decoder 202 includes a first level 207, a second level 208, a third level 209 and a fourth level 211. The intermediate representation may be transferred through each of layers of the first level 207, the second level 208, the third level 209 and the fourth level 211 to obtain the output image.

The first level 207 may include ReLU layers 207a and 207b and 3×3 convolutional layers 207c and 207d with stride 1 and padding 1. The convolutional layer 207c may be interposed between the ReLU layers 207a and 207b, and the ReLU layer 207b may be interposed between the convolutional layers 207c and 207d. For example, each of the ReLU layers 207a and 207b and the convolutional layers 207c and 207d may have a size of 8×8×384.

The second level 208 may include a 2×2 upsampling layer 208a, 3×3 convolutional layers 208b, 208c and 208d with stride 1 and padding 1, a depth concatenation layer 208e and ReLU layers 208f and 208g. The layers of the second level 208 may be in an order of, from an input to an output, the upsampling layer 208a, the convolutional layer 208b, the depth concatenation layer 208e, the ReLU layer 208f, the convolutional layer 208c, the ReLU layer 208g and the convolutional layer 208d. For example, each of the upsampling layer 208a, the convolutional layers 208b, 208c and 208d and the ReLU layers 208f and 208g may have a size of 16×16×192, and the depth concatenation layer 208e may have a size of 16×16×384.

The third level 209 may include a 2×2 upsampling layer 209a, 3×3 convolutional layers 209b, 209c and 209d with stride 1 and padding 1, a depth concatenation layer 209e and ReLU layers 209f and 209g. The layers of the third level 209 may be in an order of, from an input to an output, the upsampling layer 209a, the convolutional layer 209b, the depth concatenation layer 209e, the ReLU layer 209f, the convolutional layer 209c, the ReLU layer 209g and the convolutional layer 209d. For example, each of the upsampling layer 209a, the convolutional layers 209b, 209c and 209d and the ReLU layers 209f and 209g may have a size of 64×64×48, and the depth concatenation layer 209e may have a size of 64×64×96.

The fourth level 211 may include a 2×2 upsampling layer 211a, 3×3 convolutional layers 211b, 211c and 211d with stride 1 and padding 1, a depth concatenation layer 211e, ReLU layers 211f and 211g and an 1×1 convolutional layer 211h with stride 1 and padding 1. The layers of the fourth level 211 may be in an order of, from an input to an output, the upsampling layer 211a, the convolutional layer 211b, the depth concatenation layer 211e, the ReLU layer 211f, the convolutional layer 211c, the ReLU layer 211g and the convolutional layer 211d and the convolutional layer 211h. For example, each of the upsampling layer 211a, the convolutional layers 211b, 211c and 211d and the ReLU layers 211f and 211g may have a size of 128×128×24, the depth concatenation layer 211e may have a size of 128×128×48, and the convolutional layer 211h may have a size of 128×128×3.

FIG. 3 is a diagram illustrating another structure of an AI-based image processing model 210 according to embodiments of the present disclosure.

As shown in FIG. 3, the AI-based image processing model 210 may include a Bayer processing front-end network 210A and a photo-finishing back-end network 210B.

The Bayer processing front-end network 210A may include an encoder 201A and a decoder 202A. The Bayer processing front-end network 210A may perform at least one of active area cropping, linearization, black level subtraction, normalization, demosaicing, denoising, white balance, and color space transform.

The photo-finishing back-end network 210B may include an encoder 201B and a decoder 202B. The photo-finishing back-end network 210B may perform digital exposure adjustment, local tone mapping, general color manipulation, selective color manipulation (e.g., skin tone manipulation), global tone mapping, YuV denosing, multi-frame fusion (e.g., multi-frame fusion in a YuV domain), a final color space conversion, gamma correction, grain adding process, resizing and resampling, and compression.

Each of the Bayer processing front-end network 210A and the photo-finishing back-end network 210B may have the same or substantially the same structure as the AI-based image processing model 210 illustrated in FIGS. 2B and 2C.

Figure 4A:
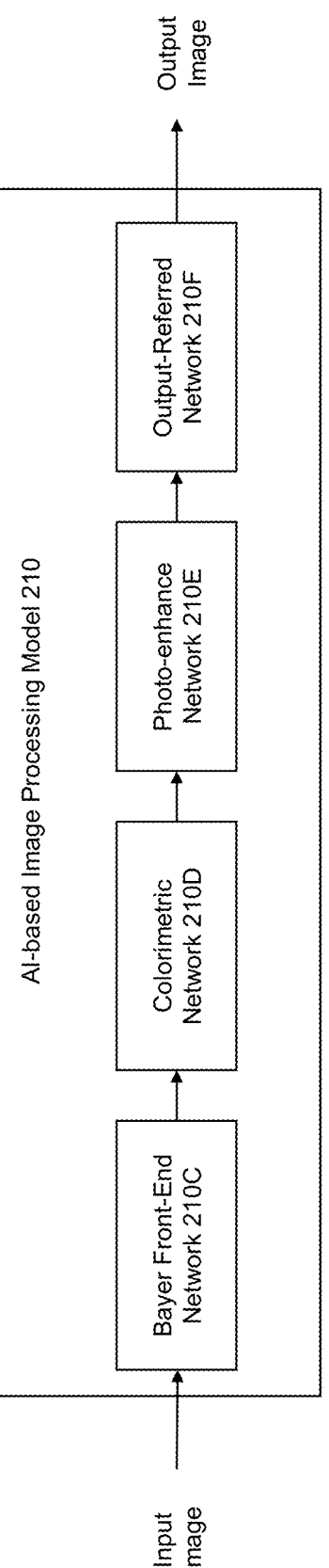
FIG. 4A is a diagram illustrating still another structure of an AI-based image processing model according to embodiments of the present disclosure.

FIG. 4A is a diagram illustrating another structure of an AI-based image processing model 210 according to embodiments of the present disclosure.

As shown in FIG. 4A, the AI-based image processing model 210 may include a Bayer front-end network 210C, a colorimetric network 210D, a photo-enhance network 210E, and an output-referred network 210F.

The Bayer front-end network 210C may perform joint demosaicing and denoising on an input image. The colorimetric network 210D may map colors from a camera sensor space to a canonical space such as CIE XYZ. The colorimetric network 210D may estimate an illumination in a scene where the input image is captured, and may apply white-balance using the estimated illumination. Also, the colorimetric network 210D may transform the white-balanced input image to the canonical CIE XYZ space. The photo-enhance network 210E may perform enhancement or photo-finishing processing to enhance aesthetic appeal. The output-referred network 210F may map the image to a display-referred color space such as sRGB, and may further perform color manipulations and image compression.

Each of the Bayer front-end network 210C, the colorimetric network 210D, the photo-enhance network 210E, and the output-referred network 210F may have the same or substantially the same structure as the AI-based image processing model 210 illustrated in FIGS. 2B and 2C.

Figure 4B:
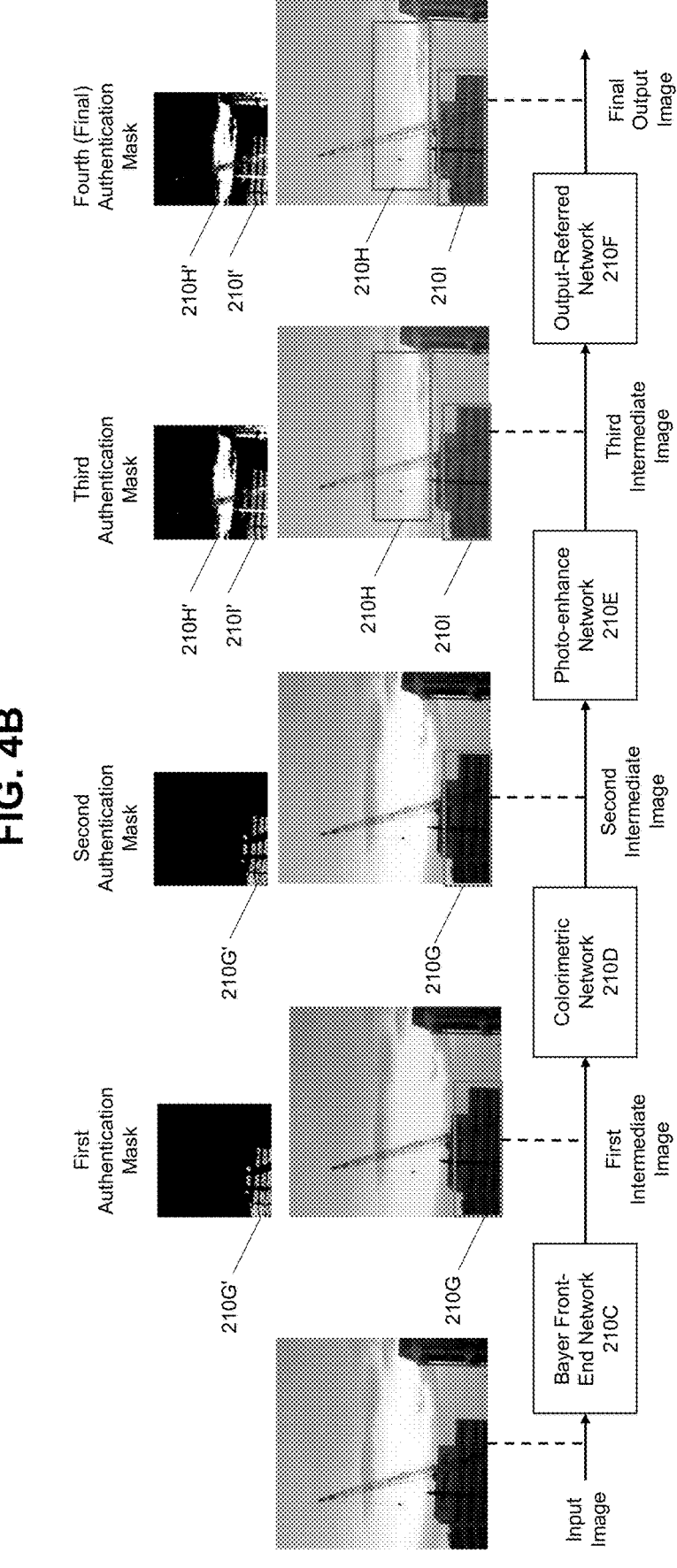
FIG. 4B illustrates images that are processed through the AI-based image processing model of FIG. 4A, and also illustrates authentication masks of the processed image according to embodiments of the present disclosure.

FIG. 4B illustrates example images that are processed through a plurality of neural networks included in the AI-based image processing model 210, and also illustrates authentication masks that indicate fake pixels included in the images. For example, the plurality of neural networks illustrated in FIG. 4B may have the following characteristics.

TABLE 1

| | Fake Pixels | Image Processing Type | Network Loss Type |
|---|---|---|---|
| Network 1 | YES | Demosaicing and Denoising | Adversarial loss |
| Network 2 | NO | White Balance and Color Space Transform | Reconstruction loss |
| Network 3 | YES | General Enhancement | Adversarial loss |
| Network 4 | NO | Final Color Space Conversion | Reconstruction loss |

Referring to FIG. 4B, the Bayer-front end network 210C may perform demosaicing on an input image (e.g., a single-channel Bayer raw image) and if the Bayer-front end network 210C is trained to minimize an adversarial loss, the Bayer-front end network 210C may hallucinate objects in the input image. For example, the Bayer-front end network 210C may hallucinate a scene content 210G around edges of building windows in the input image. The Bayer-front end network 210C may output a first intermediate image (e.g., a demosaiced 3-channel raw-RGB image) in which the scene content around the edges of the building windows is hallucinated. Based on the first intermediate image, the processor 200 may generate a first authentication mask which indicates a fake pixel region 210G' corresponding to the scene content around the edges of the building windows, as fake pixels. The processor 200 may store the first authentication mask as metadata of the first intermediate image.

The colorimetric network 210D receives the first intermediate image (e.g., the demosaiced 3-channel raw-RGB image), and obtains a second intermediate image by performing white-balance and color space transform on the first intermediate image. If a reconstruction loss is applied to the colorimetric network 210D, the colorimetric network 210D does not change, delete, or add a scene content of the first intermediate image, and does not produce fake pixels. Therefore, the processor 200 carries forward the first authentication mask from the previous stage to the current stage of the colorimetric network 210D, and uses the first authentication mask as an authentication mask of the second intermediate image (i.e., a second authentication mask). The processor 200 stores the second authentication mask as metadata of the second intermediate image.

The photo-enhance network 210E may receive the second intermediate image, and may hallucinate objects in the second intermediate image if an adversarial loss is applied to the photo-enhance network 210E. For example, the photo-enhance network 210E may obtain a third intermediate image by hallucinating an underexposed or overexposed content 210H and 210I (e.g., sky and building texture in FIG. 4B) in the second intermediate image. Based on the third intermediate image, the processor 200 may generate a third authentication mask which indicates fake pixel regions 210H' and 210I' corresponding to the hallucinated underexposed or overexposed content 210H and 210I, as fake pixels. The processor 200 may store the third authentication mask as metadata of the third intermediate image.

The output-referred network 210F receives the third intermediate image, and obtains a final output image by mapping the third intermediate image to a display-referred color space such as sRGB, and by further performing color manipulations and image compression on the third intermediate. If a reconstruction loss is applied to the output-referred network 210F, the output-referred network 210F does not change, delete, or add a scene content of the third intermediate image, and does not produce fake pixels. Therefore, the processor 200 carries forward the third authentication mask from the previous stage to the final stage, and uses the third authentication mask as a final authentication mask of the final output image. The processor 200 stores the final authentication mask as metadata of the final output image. The final authentication mask is an integration of all the previous stage masks.

The processor 200 may store the first intermediate image along with the first authentication mask, store the second intermediate image along with the second authentication mask, store the third intermediate image along with the third authentication mask, and store the final output image along with the final authentication mask.

In FIG. 4B, an authentication mask at a current stage shows all fake pixels that are generated at all the previous stages and the current stage, but the embodiments are not limited thereto. For example, an authentication mask at the current stage may show only the fake pixels which are generated at the current stage, without showing the previously generated fake pixels.

Figure 5:
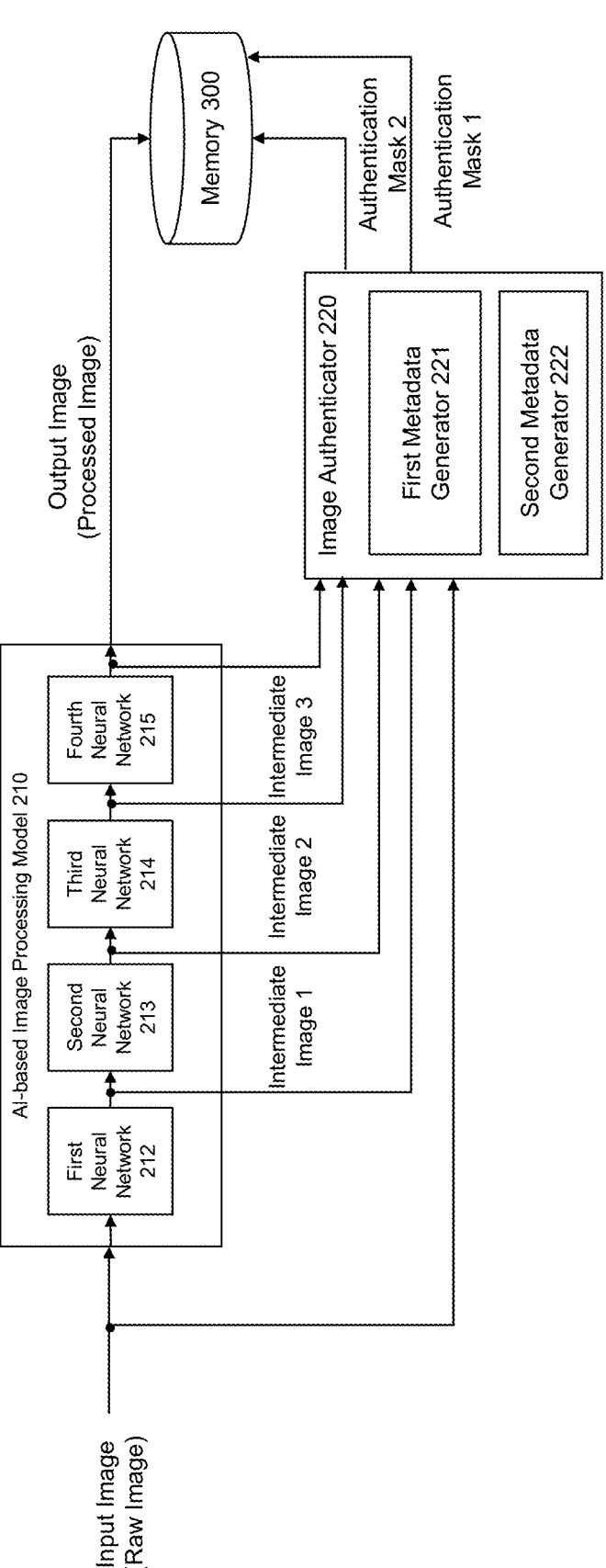
FIG. 5 is a diagram illustrating a method of generating authentication metadata when the AI-based image processing model include a plurality of neural networks, according to embodiments of the present disclosure.

FIG. 5 is a diagram illustrating a method of generating authentication metadata in when the AI-based image processing model 210 includes a plurality of neural networks.

Referring to FIG. 5, the AI-based image processing model 210 may include a plurality of neural networks, for example, a first neural network 212, a second neural network 213, a third neural network 214, and a fourth neural network 215. The first neural network 212, the second neural network 213, the third neural network 214, and the fourth neural network 215 may perform different image processing algorithms. For example, the first neural network 212, the second neural network 213, the third neural network 214, and the fourth neural network 215 may correspond to the Bayer front-end network 210C, the colorimetric network 210D, the photo-enhance network 210E, and the output-referred network 210F, respectively.

At each stage of the plurality of neural networks 212-215, authentication metadata (e.g., authentication metadata in the form of a binary mask with a value of 1 denoting fake pixels) may be computed and carried forward to the next stage. A final authentication metadata is saved as metadata of the final output image of the plurality of neural networks, 212-215. Also, authentication metadata that is computed at each stage, may be saved as metadata of an intermediate image that is output from each of the plurality of neural networks, 212-215. Authentication metadata may indicate which parts of an image are not authentic (i.e., fake pixels). The term "fake pixel" may refer to a pixel value that is generated by adding a new scene content that does not exist in an input image, changing an existing scene content, or deleting the existing scene content, via AI image processing. The faking of pixel values may occur at capture time as part of an image capture process on the camera hardware. For example, when a set of images are captured as a raw burst image, and are aligned and fused to produce a single raw image via a neural network that uses an adversarial loss function, the fused single image raw may have fake pixel values. If an AI module or a neural network modifies the input image for a purpose of hallucinating details, and thereby changes, adds, deletes a scene content in the input image, the AI module or the neural network may be determined to generate fake pixels. In other words, pixels are flagged as fake only if they undergo processing that intentionally hallucinates content. For example, a processor may determine whether an AI module or a neural network generates fake pixels, based on a loss type used for training the AI-module or the neural network. If an AI module is trained based on a reconstruction-based loss function (e.g., a mean squared error (MSE) or a mean absolute error (MAE)) to recover an original signal, the processor may determine that the AI module does not generate fake pixels. If an AI module is trained based on a perceptual loss function (e.g., a Visual Geometry Group (VGG) loss or a learned perceptual image patch similarity (LPIPS) loss) or an adversarial loss function to perform image enhancement (e.g., deblurring, filtering, and contrast algorithms) to hallucinate details or features that produce a perceptually pleasing image, the processor may determine that the AI module generates fake pixels. For example, all types of generative models including, but not limited to, generative adversarial networks (GANs), variational autoencoders (VAEs), flow-based models, diffusion models, may be considered as an AI model that can potentially generate hallucinate content. Also, if an AI module manipulates only the colors of the image, not a scene content (e.g., structure, texture, etc.), the processor may determine that the AI module does not generate fake pixels, and may determine that an output image of the AI module is authentic.

The authentication metadata may be downsampled and/or compressed to reduce the size of the authentication metadata. Also, the authentication metadata may be secured with a security key, non-fungible tokens (NFT) and block chain technology to prevent tampering.

The memory 300 may store network configuration information of the plurality of neural networks 212-215, for example, as shown in Table 1 above. When the first neural network 212, the second neural network 213, the third neural network 214, and the fourth neural network 215 correspond to the Bayer front-end network 210C, the colorimetric network 210D, the photo-enhance network 210E, and the output-referred network 210F, respectively, the memory 300 may store information indicating that the first neural network 212 and the third neural network 214 generate fake pixels, and the second neural network 213 and the fourth neural network 215 do not generate fake pixels. The photo-enhance network 210E may perform super-resolution.

The processor 200 may determine whether to generate authentication metadata for each of the first intermediate image, the second intermediate image, the third intermediate image, and the final output image, based on the network configuration information of each of the plurality of neural networks 212-215. The processor 200 may determine to skip generating authentication metadata for an image that is processed through the second neural network 213 and the fourth neural network 215, and may carry forward authentication metadata from the previous stage, since the second neural network 213 and the fourth neural network 215 do not generate fake pixels, referring to Table 1.

The processor 200 may generate a first authentication metadata and a second authentication metadata for the first intermediate image and the third intermediate image which are output from the first neural network 212 and the third neural network 214, respectively. In particular, the AI-based image processing model 210 may provide the first intermediate image and the third intermediate image to the image authenticator 220. The image authenticator 220 may analyze the first intermediate image and the third intermediate image via the first metadata generator 221 or the second metadata generator 222. The image authenticator 220 may identify fake pixels included in the first intermediate image and the third intermediate image, and may generate the first authentication metadata and the second authentication metadata which indicates position of fake pixels included in the first intermediate image and the third intermediate image, respectively.

Depending on embodiments, the second authentication metadata may indicate fake pixels that are generated by the third neural network 214 only, or may indicate fake pixels that are generated by both the first neural network 212 and the third neural network 214. The image authenticator 220 may compare an input image and an output image of the third neural network 214 (i.e., the second intermediate image and the third intermediate image) to generate the second authentication metadata that shows fake pixels that are generated by the third neural network 214 only. Alternatively, the image authenticator 220 may compare an input image of the AI-based image processing model 210 (i.e., an input image of the first neural network 212) with the output image of the third neural network 214 (i.e., the third intermediate image) to generate the second authentication metadata that shows fake pixels that are generated by all the preceding neural networks and the current neural network (i.e., the first neural network 212, the second neural network 213, and the third neural network 214).

The processor 200 may store the first authentication metadata and the second authentication metadata with the first intermediate image and the third intermediate image, in the memory 300. For example, the first authentication metadata and the second authentication metadata may be embedded in a JPEG comment field of the first intermediate image and the third intermediate image, respectively. The third intermediate image may have the second authentication metadata when an authentication mask shows only the fake pixels which are generated at the current stage without showing the previously generated fake pixels. On the other hand, the third intermediate image may have the first authentication metadata and the second authentication metadata when the authentication mask shows the fake pixels which are generated at the current stage in addition to the previously generated fake pixels.

Figure 6:
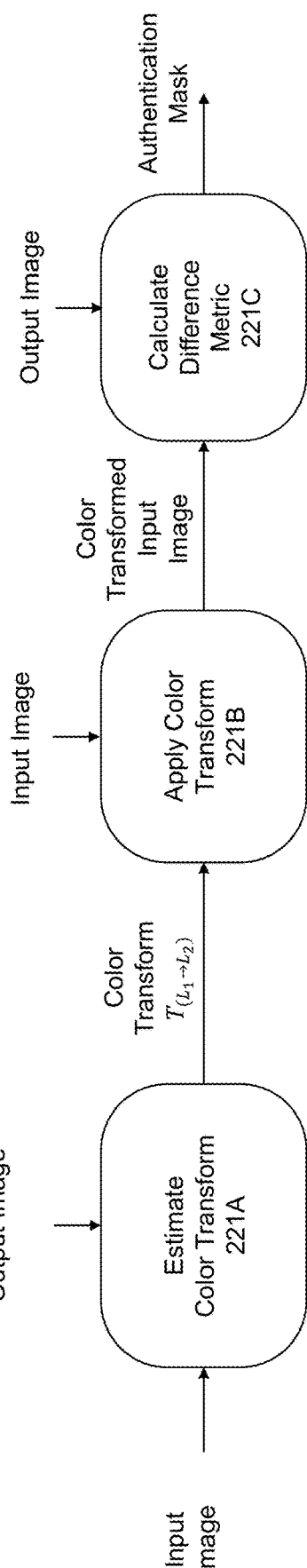
FIG. 6 is a diagram illustrating a method of generating authentication metadata according to embodiments of the present disclosure.

FIG. 6 is a diagram illustrating a method of generating authentication metadata according to embodiments of the present disclosure. For example, the method illustrated in FIG. 6 may be performed by the first metadata generator 221 based on a difference metric.

In operation 221A, the first metadata generator 221 may estimate a color transform T that maps the colors of an input image to the output image. The color transform T may be estimated using a linear mapping method (e.g., y=ax+b where saturated pixels are excluded during estimation of the color transform), or a non-linear mapping method (e.g., a second degree polynomial having a form of $ax^2+bx+c$ or higher order functions).

The input image and the output image may be an input image and an output image of any one of the plurality of neural networks 212-215, or may be an input image of the first neural network 212 and an output image of the fourth neural network 215. The color transform T is applied to the input image to map the color values of the input image to the output image and thereby to obtain a color transformed input image.

More specifically, given the input image $I_1 \in R^{n \times 3}$ and the output image $I_2 \in R^{n \times 3}$ with n pixels of the same scene, a linear color transform $T \in R^{3 \times 3}$ between the color values of the input image $I_1$ and the output image $I_2$ may be expressed as $I_2 \approx I_1 T$.

T may be computed using a pseudo inverse as follows:

$$T = (I_1^T I_1)^{-1} I_1^T I_2.$$

More specifically, given A denotes pixel values in R, G, B color channels for the input image $I_1$, B denotes pixel values in R, G, B color channels for the output image $I_2$, the 3×3 color transformation matrix T between A and B is calculated as follows.

$$A \times T = B$$

$$A = \begin{bmatrix} a_{1R} & a_{1G} & a_{1B} \\ a_{2R} & a_{2G} & a_{2B} \\ \dots & \dots & \dots \\ a_{NR} & a_{NG} & a_{NB} \end{bmatrix}$$

$$T = \begin{bmatrix} t_{11} & t_{12} & t_{13} \\ t_{21} & t_{21} & t_{23} \\ t_{31} & t_{31} & t_{33} \end{bmatrix}$$

$$B = \begin{bmatrix} b_{1R} & b_{1G} & b_{1B} \\ b_{2R} & b_{2G} & b_{2B} \\ \dots & \dots & \dots \\ b_{NR} & b_{NG} & b_{NB} \end{bmatrix}$$

In the matrices of A and B, the three columns correspond to R, G, B color channels, and the rows correspond to the number of pixels in the input image and the output image $I_2$, respectively.

Using a pseudo-inverse equation, the 3×3 color transformation matrix T is calculated as follows:

$$T = \left( \begin{bmatrix} a_{1R} & a_{1G} & a_{1B} \\ a_{2R} & a_{2G} & a_{2B} \\ \dots & \dots & \dots \\ a_{NR} & a_{NG} & a_{NB} \end{bmatrix}^T \begin{bmatrix} a_{1R} & a_{1G} & a_{1B} \\ a_{2R} & a_{2G} & a_{2B} \\ \dots & \dots & \dots \\ a_{NR} & a_{NG} & a_{NB} \end{bmatrix} \right)^{-1} \begin{bmatrix} a_{1R} & a_{1G} & a_{1B} \\ a_{2R} & a_{2G} & a_{2B} \\ \dots & \dots & \dots \\ a_{NR} & a_{NG} & a_{NB} \end{bmatrix}^T \begin{bmatrix} b_{1R} & b_{1G} & b_{1B} \\ b_{2R} & b_{2G} & b_{2B} \\ \dots & \dots & \dots \\ b_{NR} & b_{NG} & b_{NB} \end{bmatrix}$$

In the embodiment, the 3×3 color transformation matrix is used since the 3×3 color transformation matrix is linear and accurate, and computationally efficient. However, the size of the color transformation matrix is not limited thereto, and any 3×M color transformation matrix (wherein M≥3) may be used.

Referring back to FIG. 6, in operation 221B, the color transform is applied to the input image so that the input image's colors are mapped to those of the output image.

In operation 221C, the color transformed input image is compared with the output image, to calculate a difference metric between the color transformed input image and the output image, and to generate authentication metadata based on the difference metric. For example, an L1 difference between the color transformed input image and the output image is computed for each pixel, and a thresholding operation is applied to the L1 difference to obtain a binary authentication mask as the authentication metadata. An L1 difference that is less than a preset threshold may be converted to "0" to indicate an authentic pixel, and an L1 difference that is greater than or equal to the present threshold may be converted to "1" to indicate a fake pixel in the binary authentication mask. Alternatively, an L2 difference or any Lp difference may be computed to generate an authentication mask (where p denotes a real number greater than or equal to 1). When there are two vectors $A=(x_1, y_1)$ and $B=(x_2, y_2)$, an $L_1$ difference may be computed as $|x_1-x_2|+|y_1-y_2|$, an $L_2$ difference may be computed as $\sqrt{(x_1-x_2)^2+(y_1-y_2)^2}$, and an Lp difference may be computed as $\{\Sigma_i|x_i-y_i|^p\}^{1/p}$.

When the camera 100 captures a 12 mega-pixel image of resolution 3000×4000 pixel, a display-referred output of the camera 100 in lossy JPEG-compressed format is about 2 MB to 4 MB, and a lossless binary authentication mask at a full resolution may be about 150 KB to 300 KB. The processor 200 may perform downsampling on the lossless binary authentication mask to save the storage of the memory 300. For example, the processor 200 may downsample the lossless binary authentication mask to half the resolution 1500× 2000 pixels, so that the file size reduces to about 64 KB to 96 KB, which represents a very nominal overhead of 2% to 3%.

The processor 200 may encrypt the authentication mask and store an encrypted version of the authentication mask with the image, or may generate a key to retrieve the authentication mask and store the key with the image.

Figure 7:
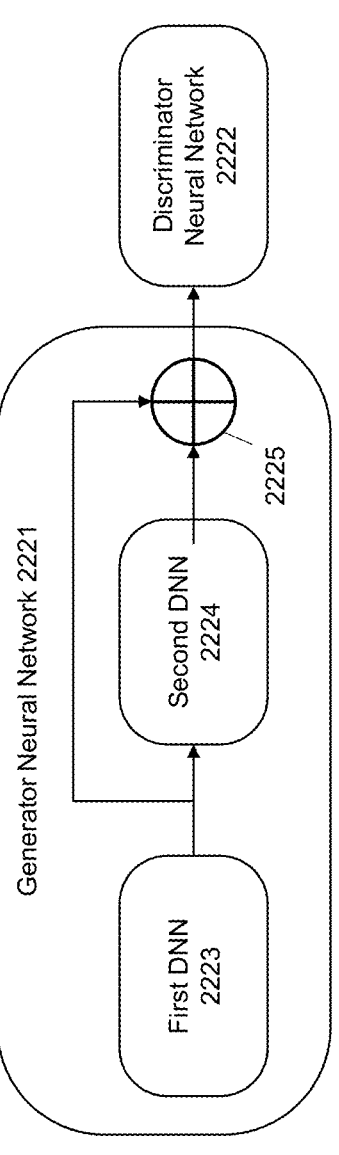
FIG. 7 is a diagram illustrating a method of generating an artificial intelligence model configured to generate authentication metadata, according to embodiments of the present disclosure.

FIG. 7 is a diagram illustrating a method of generating an artificial intelligence model configured to generate authentication metadata. For example, each of the plurality of neural networks 212-215 of the AI-based image processing model 210 illustrated in FIG. 5 may be generated in the method illustrated in FIG. 7.

Referring to FIG. 7, each of a plurality of neural networks in the AI-based image processing model 210 may be configured to have a structure of a generator neural network 2221 in which a reconstruction-loss-based image processing part and a residual image generating part are separated and cascaded. The generator neural network 2221 may be trained using a discriminator neural network 2222. The generator neural network 2221 is trained to generate a realistic image (e.g., a fake image) and thereby to fool the discriminator neural network 2222 into classifying the generated image as authentic. The discriminator neural network 2222 is trained to classify the generated image as fake. The discriminator neural network 2222 may be any type of neural network, including a convolutional neural network having fully-connected layers.

The generator neural network 2221 may include a first deep neural network (DNN) 2223, a second DNN 2224, and an adder 2225. Each of the first DNN 2223 and the second DNN 2224 may have a UNet encoder-decoder structure, as shown in FIGS. 2B and 2C, although the structures of the first DNN 2223 and the second DNN 2224 are not limited thereto. The first DNN 2223 and the second DNN 2224 can be any type of neural network such as a fully connected network, a convolutional neural network (CNN), or a recurrent neural network (RNN).

Specifically, at a first training stage, the first DNN 2223 is trained to perform image processing on an image that is input to the first DNN 2223, to obtain an output image in a manner in which a reconstruction loss between the output image and a ground-truth target image is minimized. For example, when the first DNN 2223 is implemented as a module that performs demosaicing, the input image may be a single-channel Bayer image, the output image may be a three-channel demosaiced image, and the first DNN 2223 may be trained to minimize a L1 or L2 reconstruction loss between the three-channel demosaiced image and a ground-truth target image. When the first DNN 2223 is implemented as a denoiser, the input image may be a short-exposure high-ISO noisy image, the output image may be a noise-free or less-noisy image, and the first DNN 2223 may be trained to minimize a L1 or L2 reconstruction loss between the noise-free or less-noisy image and a ground-truth target image (e.g., a long-exposure low-ISO image of the same scene). A loss is determined to be minimized when the loss reaches a local minimum value and does not reduce any longer after a preset number of iterative processes, or when the loss reaches a predetermined minimum value.

Once the training of the first DNN 2223 is completed, weights and biases of the first DNN 2223 may be fixed at a second training stage in which the second DNN 2224 and the discriminator neural network 2222 are jointly trained. For example, the first DNN 2223 and the second DNN 2224 in cascade operate as a generative neural network model in an adversarial training setup, although the first DNN 2223 and the second DNN 2224 do not necessarily need to operate as a generative neural network model.

The discriminator neural network 2222 may take as input an image (real or generated), and output a probability score that indicates the input image is a real image or an image generated by the generator neural network 2221.

In the second training stage, an output image of the first DNN 2223 is fed as input to the second DNN 2224. The second DNN 2224 outputs a residual image that is added to the input of the second DNN 2224, via the adder 2225, to obtain a combined image. When the second DNN 2224 outputs a sparse residual image, only a limited number of pixels within a predetermined range may have non-zero values and the rest of the pixels may have zero values. In such a case, the second metadata generator 222 may use a zero-threshold to determine all pixel values greater than zero as fake. When the second DNN 2224 outputs a non-sparse residual image, the second metadata generator 222 may use a non-zero threshold to identify fake pixels.

The combined image is fed as input to the discriminator neural network 2222, and the discriminator neural network 2222 outputs a probability score indicating whether the image that is input to the discriminator neural network 2222 is a real image or an image generated by the generator neural network 2221. The second DNN 2224 and the discriminator neural network 2222 are jointly trained until an adversarial loss is minimized, or converges into a constant value with a predetermined margin. According to embodiments of the present disclosure, a reconstruction loss or a learned perceptual image patch similarity (LPIP) loss may be added to the adversarial loss to stabilize the training of the AI model and to improve convergence of the loss.

In the second training stage, the parameters of the second DNN 2224 of the generator neural network 2221 and the discriminator neural network 2222 may be updated via joint training. The generator neural network 2221 may generate synthetic samples via the second DNN 2224, which are then fed into the discriminator neural network 2222 along with real data samples. The discriminator neural network 2222 may use an adversarial loss function to calculate an error between its prediction (of whether the image input to the discriminator neural network 2222 is a real image or an image generated by the generator neural network 2221) and a ground-truth label, and may update its network parameters to reduce the error. In turn, the generator neural network 2221 may update its network parameters to maximize the error rate of the discriminator neural network 2222.

In an inference stage, the output of the second DNN 2224 may be used to identify whether an image that is output from each of a plurality of neural networks (e.g., a first intermediate image output from a first neural network 212, a second intermediate image output from a second neural network 213, a third intermediate image output from a third neural network 214, and a final output image that is output from a fourth neural network 215) includes fake pixels.

Figure 8:
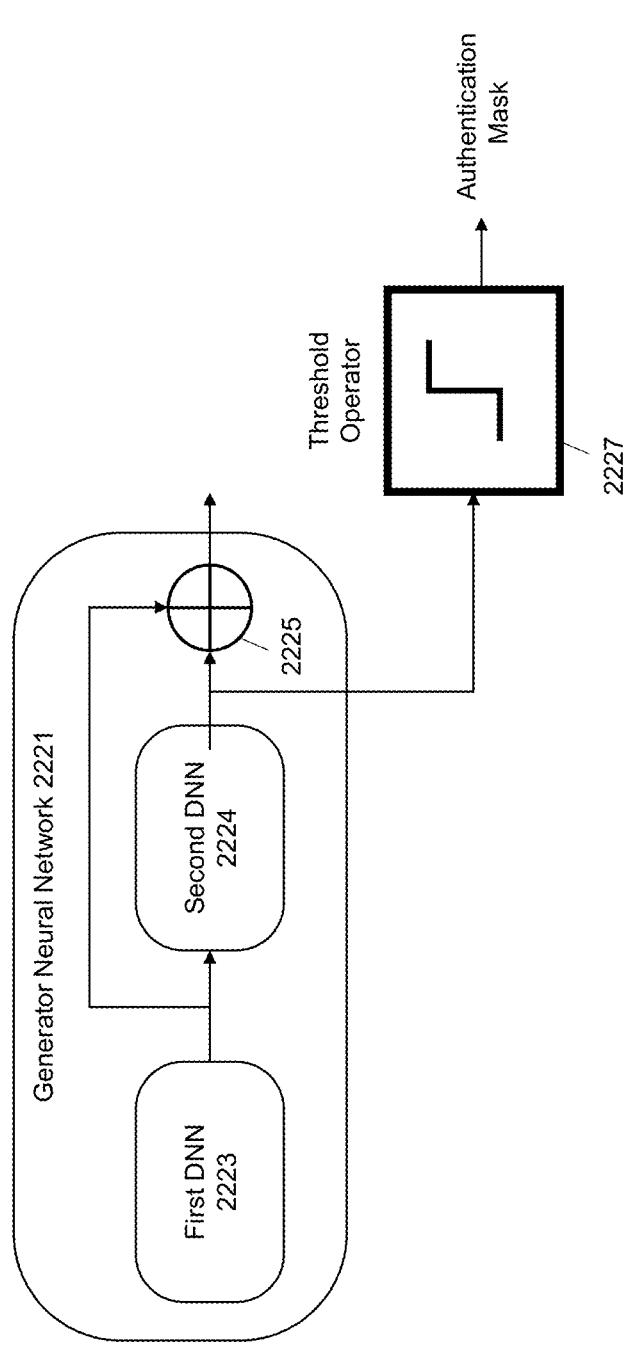
FIG. 8 is diagram illustrating a method of generating authentication metadata based on an artificial intelligence model, according to embodiments of the present disclosure.

FIG. 8 is a diagram illustrating a method of generating authentication metadata based on an artificial intelligence model, according to embodiments of the present disclosure.

Referring to FIG. 8, in an inference stage, the discriminator neural network 2222 may be discarded and an thresholding operator 2227 may be connected to an output layer of the second DNN 2224 to determine the fake pixels in the output of the generator neural network 2221. For example, the thresholding operator 2227 may use a zero value as a threshold to determine pixels having non-zero values as fake pixels. Alternatively, non-zero entries in the output of the second DNN may be directly classified as fake pixels without using the thresholding operator 2227. In other embodiments, a non-zero value may be used as a threshold value for identifying fake pixels. The output of the thresholding operator 2227 or the direct classification result may be used as authentication metadata. Additionally, morphological operations such as erosion or dilation may be applied to the thresholded output image to produce a final binary authentication mask.

Figure 9:
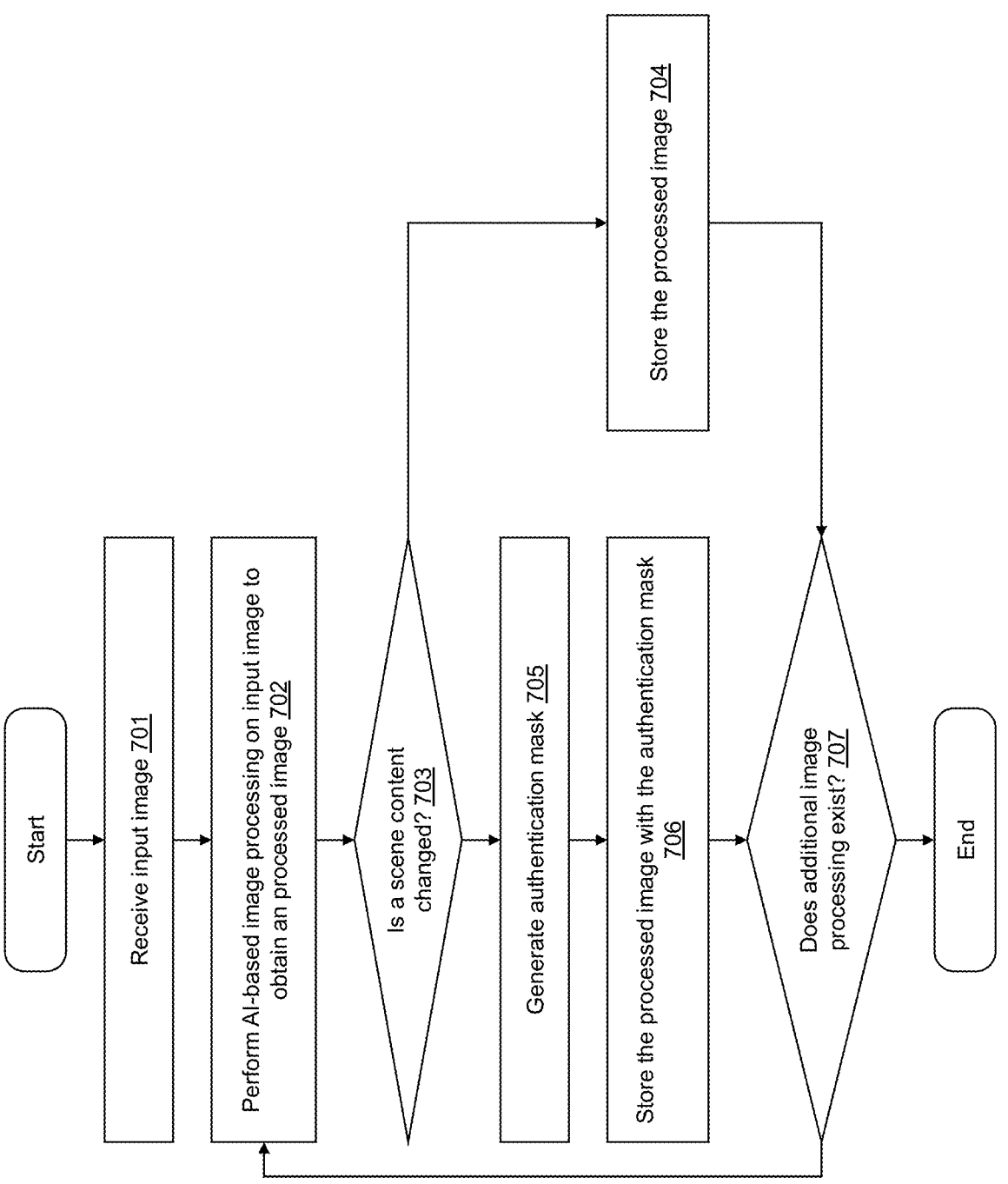
FIG. 9 is a flowchart illustrating a method of identifying a fake image according to embodiments of the present disclosure.

FIG. 9 is a flowchart illustrating a method of identifying a fake image according to embodiments of the present disclosure.

In operation 701, a processor may receive an input image.

In operation 702, the processor may perform an AI-based image processing on the input image via a neural network to obtain a processed image.

In operation 703, the processor may determine whether a scene content in the input image is changed based on a loss type of the neural network.

When the neural network is trained to minimize a reconstruction loss, it is determined that a scene content in the input image is not changed, and the method proceeds to operation 704 to store the processed image without generating authentication metadata.

When the neural network is trained without using a reconstruction loss, and instead, is trained using an adversarial loss, it is determined that a scene content in the input image may be changed, and the method proceeds to operation 705 to generate authentication metadata, for example, using a difference metric or a particular neural network structure as described with reference to FIGS. 10 and 11 below.

In operation 706, the authentication metadata is stored with the processed image as metadata of the processed image.

In operation 707, if there is an additional image processing, the method proceeds to operation 701 to obtain a second processed image, and generate second authentication metadata of the second processed image.

Operations 710-706 may be performed for each output image of a plurality of AI-based image processing modules, or may be performed only for a final output image of the plurality of AI-based image processing modules.

Figure 10:
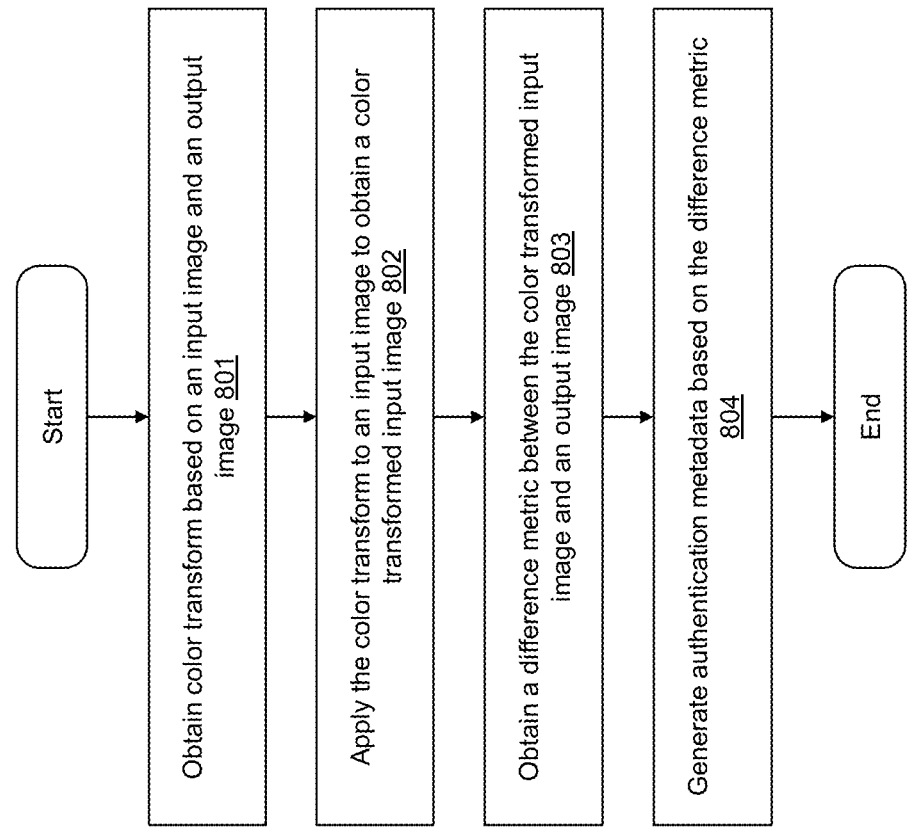
FIG. 10 is a flowchart illustrating a method of generating authentication metadata using a difference metric according to embodiments of the present disclosure.

FIG. 10 is a flowchart illustrating a method of generating authentication metadata using a difference metric according to embodiments of the present disclosure. In FIG. 10, an input image and an output image may refer to an input image and an output image of the AI-based image processing model 210, or an input image and an output image of any one of a plurality of neural networks included in the AI-based image processing model 210 (e.g., a first intermediate image and a second intermediate image which are input to and output from the second neural network 213, respectively, or a second intermediate image and a third intermediate image which are input to and output from the third neural network 212, respectively, in FIG. 5).

In operation 801, a color transform is computed based on the input image and the output image to map the input image's colors to that of the output image. The color transform may be computed using a linear mapping method, a non-linear mapping method, as described in FIG. 6.

In operation 802, the color transform is applied to the input image to obtain a color transformed image.

In operation 803, a difference metric between the color transformed input image and the output image, is obtained using a L1 difference (i.e., Manhattan distance), a L2 difference (i.e., Euclidean distance), or any Lp difference. The L1 difference, the L2 difference, and the Lp difference may represent a difference between two vectors or sets of values. The L1 difference may be computed by adding up absolute differences between elements of two vectors. The L2 difference may be obtained by computing a square root of a sum of squared differences between elements of two vectors. The Lp difference between two vectors x and y may be expressed as: $(|x_1-y_1|^p+|x_2-y_2|^p+\ldots+|x_n-y_n|^p)^{1/p}$, where $x_1, x_2, \ldots, x_n$ are n elements of vector x, $y_1, y_2, \ldots, y$ are n elements of vector y, and p is a real number greater than or equal to 1.

In operation 804, authentication metadata is generated based on the difference metric. For example, an L1 difference between the color transformed input image and the output image is computed for each pixel, and a thresholding operation is applied to the L1 difference to obtain a binary authentication mask. An L1 difference that is less than a preset threshold may be converted to "0" to indicate an authentic pixel region, and an L1 difference that is greater than or equal to the present threshold may be converted to "1" to indicate a fake pixel region in the binary authentication mask.

FIG. 11 is a flowchart illustrating a method of generating authentication metadata using a neural network model according to embodiments of the present disclosure. The neural network model may include a generator neural network that is trained using a discriminator neural network. The generator neural network may include a first deep neural network (DNN) and a second DNN.

In operation 901, a training image is input to the first DNN of the generator neural network.

In operation 902, a reconstructed image of the training image is obtained as an output of the first DNN.

In operation 903, the first DNN is trained until a reconstruction loss of the first DNN is minimized or converges.

Once the training of the first DNN is completed, network parameters of the first DNN are fixed, and the method proceeds to operation 904. In operation 904, the reconstructed image is input to the second DNN of the generator neural network.

In operation 905, a sparse residual image is obtained as an output of the second DNN.

In operation 906, the reconstructed image and the sparse residual image are combined to output a combined image.

In operation 907, the combined image is input to the discriminator neural network, and as output of the discriminator neural network, an authentication decision is obtained for the combined image. The authentication decision indicates whether the combined image is real or generated by the generator NN.

In operation 908, while the network parameters of the first DNN are fixed, the training process of the second DNN is performed using the discriminator neural network until the discriminator neural network is no longer able to differentiate between real and generated samples, or until some other stopping criterion is reached. In particular, the second DNN and the discriminator neural network are trained until an adversarial loss is minimized. The adversarial loss is determined to be minimized when the adversarial loss has reached a predetermined minimum value, or a constant value with a predetermined margin.

In an inference stage, the discriminator neural network 2222 may be discarded, and the output of the second DNN may provide information about fake pixels. In one embodiment, all non-zero entries in the output of the second DNN may be directly classified as fake pixels. Alternatively, a thresholding operation may be applied to the output of the second DNN to identify fake pixels.

Figure 12:
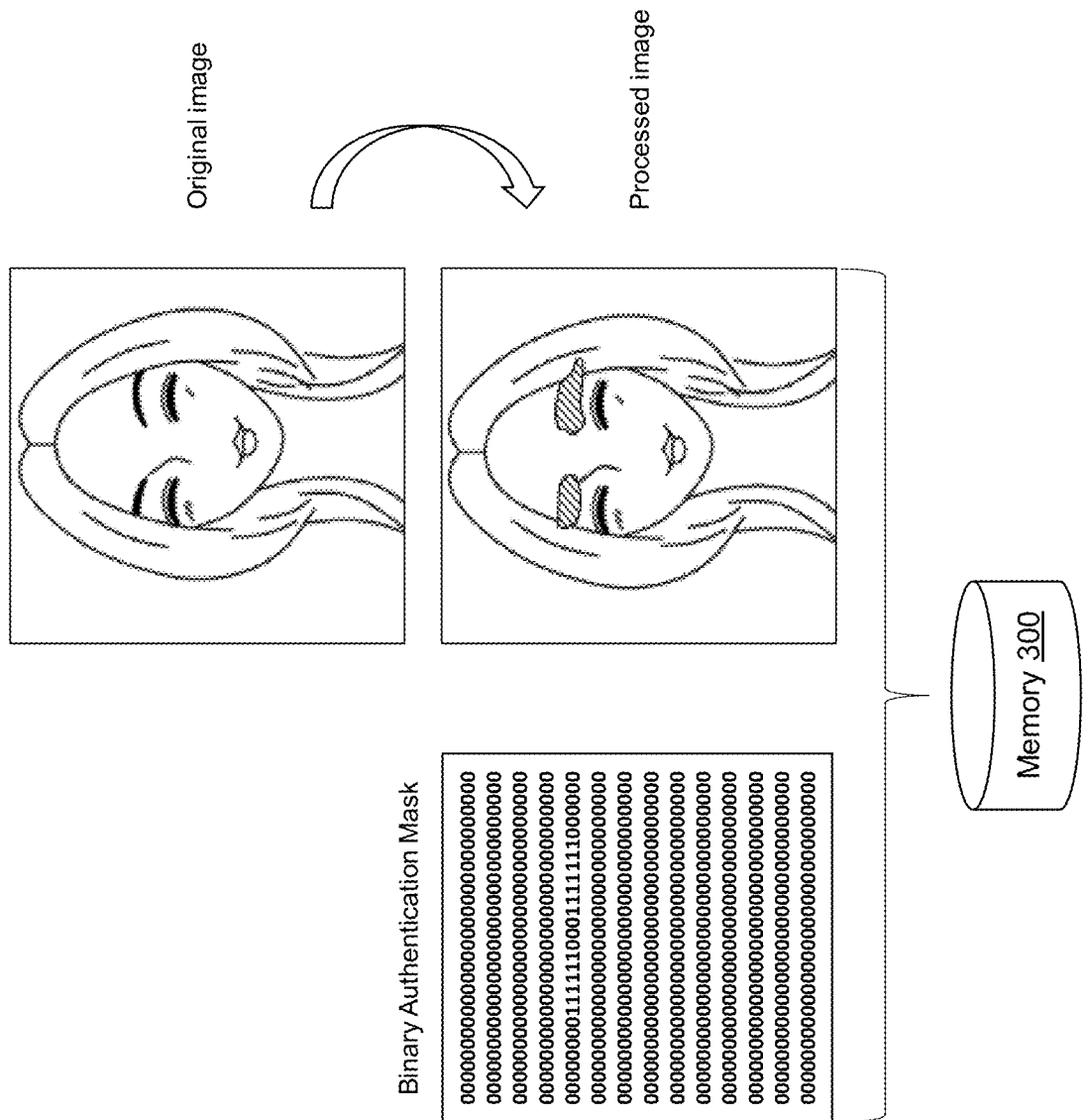
FIG. 12 illustrates an example authentication mask according to embodiments of the present disclosure.

FIG. 12 illustrates an example authentication mask according to embodiments of the present disclosure.

Referring to FIG. 12, when a processed image includes fake pixels, a binary authentication mask is generated to indicate regions corresponding to authentic pixels and regions corresponding to fake pixels, using binary values, "0" and "1." The binary authentication mask may be stored with the processed image in the memory 300, as metadata of the processed image. For example, when the processed image is displayed in a JPEG format, the binary authentication mask may be embedded as metadata in a JPEG comment field of the processed image.

FIG. 13 illustrates a graphical user interface for identifying fake pixels according to embodiments of the present disclosure.

As shown in FIG. 13, an electronic device 1000 may include a display 500 configured to display an original image, a processed image, and an original image along with a processed image. According to a user request, fake pixels may be identified in the processed image.

For example, the electronic device 1000 may execute a photo gallery application and may receive a user request to identify fake pixels in a processed image via the photo gallery application. The photo gallery application may recover a binary authentication mask from metadata that is embedded in the processed image. For example, the photo gallery application may retrieve authentication metadata from a JPEG comment field in the metadata of the processed image, and may recover a binary authentication mask based on the authentication metadata. The photo gallery application may display the binary authentication mask to be overlaid on the processed image, to visually indicate fake pixels.

Figure 14:
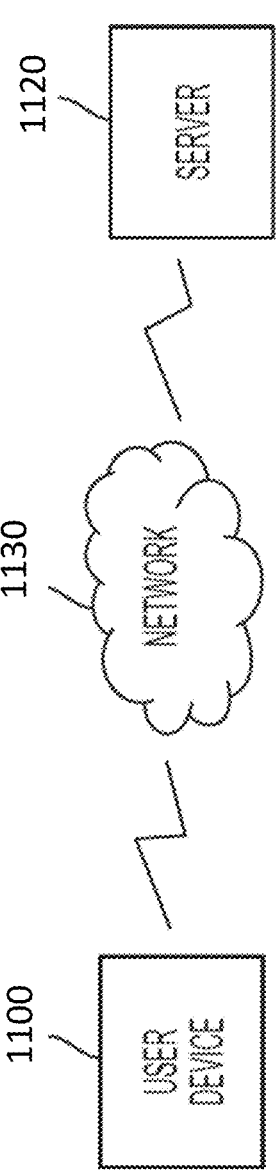
FIG. 14 is a diagram of devices for generating authentication metadata according to embodiments of the present disclosure.

FIG. 14 is a diagram of devices for generating authentication metadata according to embodiments of the present disclosure. FIG. 14 includes a user device 1100, a server 1120, and a network 1130. The user device 1110 and the server 1120 may interconnect via wired connections, wireless connections, or a combination of wired and wireless connections.

The user device 1100 includes one or more devices configured to generate an output image. For example, the user device 1100 may include a computing device (e.g., a desktop computer, a laptop computer, a tablet computer, a handheld computer, a smart speaker, a server, etc.), a mobile phone (e.g., a smart phone, a radiotelephone, etc.), a camera device, a wearable device (e.g., a pair of smart glasses or a smart watch), or a similar device.

The server 1120 includes one or more devices configured to receive an image, perform an AI-based image processing on the image to obtain a processed image, generate authentication metadata indicating fake pixels included in the processed image, and transmit the processed image and the authentication metadata to the user device 1100 according to a request from the user device 1100.

The network 1130 includes one or more wired and/or wireless networks. For example, network 1130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 14 are provided as an example. In practice, there may be additional devices and/or networks, fewer devices and/or networks, different devices and/or networks, or differently arranged devices and/or networks than those shown in FIG. 14. Furthermore, two or more devices shown in FIG. 14 may be implemented within a single device, or a single device shown in FIG. 14 may be implemented as multiple, distributed devices. Additionally, or alternatively, a set of devices (e.g., one or more devices) may perform one or more functions described as being performed by another set of devices.

Figure 15:
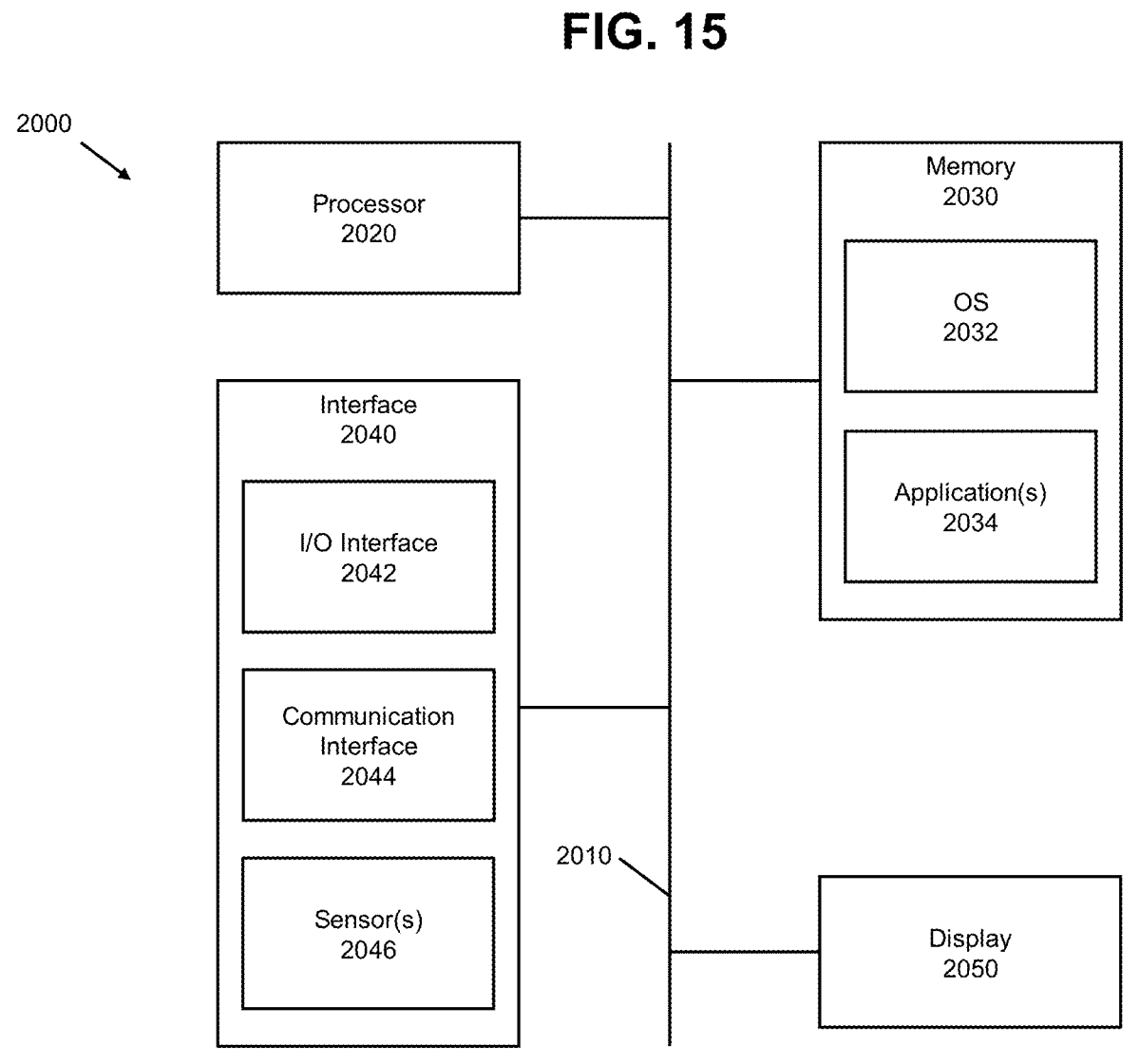

FIG. 15 is a diagram of components of one or more devices of FIG. 14 according to embodiments of the present disclosure. An electronic device 2000 may correspond to the user device 1100 and/or the server 1120.

The electronic device 2000 includes a bus 2010, a processor 2020, a memory 2030, an interface 2040, and a display 2050.

The bus 2010 includes a circuit for connecting the components 2020 to 2050 with one another. The bus 2010 functions as a communication system for transferring data between the components 2020 to 2050 or between electronic devices.

The processor 2020 includes one or more of a central processing unit (CPU), a graphics processor unit (GPU), an accelerated processing unit (APU), a many integrated core (MIC), a field-programmable gate array (FPGA), a digital signal processor (DSP), a machine learning accelerator, a neural processing unit (NPU). The processor 2020 may be a single core processor or a multi core processor. The processor 2020 is able to perform control of any one or any combination of the other components of the electronic device 2000, and/or perform an operation or data processing relating to communication. For example, the processor 2020 may include either one or both of an AI-based image processing model 210, and an image authenticator 220 which are illustrated in FIG. 1. The processor 2020 executes one or more programs stored in the memory 2030.

The memory 2030 may include a volatile and/or non-volatile memory. The memory 2030 stores information, such as one or more of commands, data, programs (one or more instructions), applications 2034, etc., which are related to at least one other component of the electronic device 2000 and for driving and controlling the electronic device 2000. For example, commands and/or data may formulate an operating system (OS) 2032. Information stored in the memory 2030 may be executed by the processor 2020. In particular, the memory 2030 may store original images, processed images, and authentication metadata of the processed images.

The applications 2034 include the above-discussed embodiments. These functions can be performed by a single application or by multiple applications that each carry out one or more of these functions. For example, the applications 2034 may include a photo gallery application. When the photo gallery application receives a user request to identify fake pixels in a processed image, the photo gallery application may recover a binary authentication mask from authentication metadata of the processed image which are stored in the memory 2030. The photo gallery application may display the binary authentication mask overlaid on the processed image, to visually indicate fake pixels.

The display 2050 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 2050 can also be a depth-aware display, such as a multi-focal display. The display 2050 is able to present, for example, various contents, such as text, images, videos, icons, and symbols.

The interface 2040 includes input/output (I/O) interface 2042, communication interface 2044, and/or one or more sensors 2046. The I/O interface 2042 serves as an interface that can, for example, transfer commands and/or data between a user and/or other external devices and other component(s) of the electronic device 2000.

The communication interface 2044 may enable communication between the electronic device 2000 and other external devices, via a wired connection, a wireless connection, or a combination of wired and wireless connections. The communication interface 2044 may permit the electronic device 2000 to receive information from another device and/or provide information to another device. For example, the communication interface 2044 may include an Ethernet interface, an optical interface, a coaxial interface, an infrared interface, a radio frequency (RF) interface, a universal serial bus (USB) interface, a Wi-Fi interface, a cellular network interface, or the like. The communication interface 2044 may receive or transmit a raw image, a processed image, and/or authentication metadata from or to an external device.

The sensor(s) 2046 of the interface 2040 can meter a physical quantity or detect an activation state of the electronic device 2000 and convert metered or detected information into an electrical signal. For example, the sensor(s) 2046 can include one or more cameras (e.g., a camera 100 illustrated in FIG. 1) or other imaging sensors for capturing images of scenes. The sensor(s) 2046 can also include any one or any combination of a microphone, a keyboard, a mouse, and one or more buttons for touch input. The sensor(s) 2046 can further include an inertial measurement unit. In addition, the sensor(s) 2046 can include a control circuit for controlling at least one of the sensors included herein. Any of these sensor(s) 2046 can be located within or coupled to the electronic device 2000.

The image authentication method may be written as computer-executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to an electronic device, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

The image authentication method may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server or a storage medium of server.

A model related to the neural networks described above may be implemented via a software module. When the model is implemented via a software module (for example, a program module including instructions), the model may be stored in a computer-readable recording medium.

Also, the model may be a part of the electronic device described above by being integrated in a form of a hardware chip. For example, the model may be manufactured in a form of a dedicated hardware chip for artificial intelligence, or may be manufactured as a part of an existing general-purpose processor (for example, a CPU or application processor) or a graphic-dedicated processor (for example a GPU).

While the embodiments of the disclosure have been described with reference to the figures, it will be understood by those of ordinary skill in the art that various changes in form and details may be made therein without departing from the spirit and scope as defined by the following claims.

What is claimed is:

1. An electronic device for performing image authentication on an image that is captured by an artificial intelligence (AI) camera module or processed by an AI-image signal processor (ISP), the electronic device comprising:
    at least memory storing instructions; and
    at least one processor configured to execute the instructions to:
    obtain an input image;
    obtain processed images of the input image via an AI-based model comprising a plurality of neural networks;
    identify at least one neural network of the plurality of neural networks that generates fake pixels, based on a loss type of each of the plurality of neural networks;
    for at least one of the processed images that is output from the identified at least one neural network, generate authentication metadata that indicates the fake pixels that have been generated by the AI-based model;
    store the authentication metadata in association with the at least one of the processed images in the at least one memory; and
    output the at least one of the processed images with an indication of the fake pixels.

2. The electronic device of claim 1, wherein the authentication metadata is a binary authentication mask that indicates the fake pixels which are generated by adding, deleting, or modifying at least one scene content included in the input image.

3. The electronic device of claim 1,
    the at least one processor is further configured to: based on each of the plurality of neural networks generating the fake pixels, generate a plurality of authentication metadata for the processed images that are output from the plurality of neural networks, respectively.

4. The electronic device of claim 1, wherein
    the at least one processor is further configured to:
    skip generation of the authentication metadata for at least one remaining neural network that is identified as not generating the fake pixels, among the plurality of neural networks.

5. The electronic device of claim 4, wherein the at least one processor is further configured to:
    identify the at least one neural network that is trained using a perceptual loss or an adversarial loss, as the at least one neural network that generates the fake pixels; and
    identify a neural network that is trained using a reconstruction loss, or is configured to change colors of the input image without altering scene content, as the at least one remaining neural network that does not generate the fake pixels.

6. The electronic device of claim 1, wherein the at least one processor is further configured to:
    generate the authentication metadata by:
    applying to the input image a color transform that maps colors of the input image to an output image of at least one neural network of the AI-based model, to obtain a color transformed image; and
    computing a difference metric between the color transformed image and the output image for each pixel.

7. The electronic device of claim 1, wherein the at least one processor is further configured to:
    generate the authentication metadata via the AI-based model that comprises a generator neural network.

8. The electronic device of claim 7, wherein the generator neural network comprises:

a first neural network that is trained using a reconstruction loss at a first training step; and a second neural network that is jointly trained with a discriminator neural network using an adversarial loss, at a second training step at which network parameters of the first neural network are fixed, and wherein the at least one processor is further configured to generate the authentication metadata based on an output of the second neural network.

9. A method for performing image authentication on an image that is captured by an artificial intelligence (AI) camera module or processed by an AI-image signal processor (ISP), the method comprising:

obtaining an input image;

obtaining a processed image of the input image via an artificial intelligence (AI)-based model comprising a plurality of neural networks;

identifying at least one neural network of the plurality of neural networks that generates fake pixels, based on a loss type of each of the plurality of neural networks;

for at least one of the processed images that is output from the identified at least one neural network, generating authentication metadata that indicates the fake pixels that have been generated by the AI-based model;

storing the authentication metadata in association with the at least one of the processed images in the at least one memory; and outputting the at least one of the processed images with an indication of the fake pixels.

10. The method of claim 9, wherein the authentication metadata is a binary authentication mask that indicates the fake pixels which are generated by adding, deleting, or modifying at least one scene content included in the input image.

11. The method of claim 9, the method further comprises:

based on each of the plurality of neural networks generating the fake pixels, generating a plurality of authentication metadata for the processed images that are output from the plurality of neural networks, respectively.

12. The method of claim 9, wherein the method further comprises:

skipping generation of the authentication metadata for at least one remaining neural network that is identified as not generating the fake pixels, among the plurality of neural networks.

13. The method of claim 12, further comprising:

identifying the at least one neural network that is trained using a perceptual loss or an adversarial loss, as the at least one neural network that generates the fake pixels; and identifying a neural network that is trained using a reconstruction loss, or is configured to change colors of the input images without altering scene content, as the at least one remaining neural network that does not generate the fake pixels.

14. The method of claim 9, wherein the generating of the authentication metadata comprises:

applying to the input image a color transform that maps colors of the input image to an output image of at least one neural network of the AI-based model, to obtain a color transformed image;

computing a difference metric between the color transformed image and the output image for each pixel; and generating the authentication metadata based on the difference metric.

15. The method of claim 9, wherein the generating of the authentication metadata comprises:

generating the authentication metadata via the AI-based model that comprises a generator neural network.

16. The method of claim 15, wherein the generator neural network comprises:

a first neural network that is trained using a reconstruction loss at a first training step; and a second neural network that is jointly trained with a discriminator neural network using an adversarial loss, at a second training step at which network parameters of the first neural network are fixed, and wherein the generating the authentication metadata further comprises: generating the authentication metadata based on an output of the second neural network.

17. A non-transitory computer readable storage medium that stores instructions to be executed by at least one processor to perform a method for performing image authentication on an image that is captured by an artificial intelligence (AI) camera module or processed by an AI-image signal processor (ISP), the method comprising:

obtaining an input image;

obtaining a processed image of the input image via an artificial intelligence (AI)-based model comprising a plurality of neural networks;

identifying at least one neural network of the plurality of neural networks that generates fake pixels, based on a loss type of each of the plurality of neural networks;

for at least one of the processed images that is output from the identified at least one neural network, generating authentication metadata that indicates the fake pixels that have been generated by the AI-based model;

storing the authentication metadata in association with the at least one of the processed images in the at least one memory; and outputting the at least one of the processed images with an indication of the fake pixels.

18. The non-transitory computer readable storage medium of claim 17, wherein the authentication metadata is a binary authentication mask that indicates the fake pixels which are generated by adding, deleting, or modifying at least one scene content included in the input image.

19. The non-transitory computer readable storage medium of claim 18, wherein the outputting the processed image with the indication of the fake pixels, comprises:

displaying the binary authentication mask to be overlaid on the processed image.

* * * * *